(12) United States Patent
Kraus et al.

(10) Patent No.: US 10,746,653 B2
(45) Date of Patent: Aug. 18, 2020

(54) FLUID PROPERTY DETERMINATION BASED ON PARTIAL LEAST SQUARES ANALYSIS

(75) Inventors: Paul R. Kraus, Apple Valley, MN (US); Victor N. Morin, Apple Valley, MN (US)

(73) Assignee: Ecolab USA Inc., Saint Paul, MN (US)

( * ) Notice: Subject to any disclaimer, the term of this patent is extended or adjusted under 35 U.S.C. 154(b) by 422 days.

(21) Appl. No.: 13/094,367

(22) Filed: Apr. 26, 2011

(65) Prior Publication Data

US 2012/0273351 A1 Nov. 1, 2012

(51) Int. Cl.
| G01N 21/33 | (2006.01) |
| G05B 13/04 | (2006.01) |
| G05B 13/00 | (2006.01) |
| G05B 23/00 | (2006.01) |
| G05B 23/02 | (2006.01) |

(52) U.S. Cl.
CPC .......... *G01N 21/33* (2013.01); *G05B 13/00* (2013.01); *G05B 13/04* (2013.01); *C02F 2209/001* (2013.01); *C02F 2209/003* (2013.01); *C02F 2209/28* (2013.01); *G05B 23/0281* (2013.01)

(58) Field of Classification Search
None
See application file for complete search history.

(56) References Cited

U.S. PATENT DOCUMENTS

| 4,975,581 A | * | 12/1990 | Robinson et al. ....... 250/339.09 |
| 5,298,428 A | | 3/1994 | O'Rourke et al. |
| 5,680,220 A | | 10/1997 | Delignieres et al. |
| 6,093,292 A | | 7/2000 | Akiyama |
| 6,719,891 B2 | | 4/2004 | Ruhr et al. |
| 7,610,157 B2 | | 10/2009 | Miller et al. |
| 7,639,361 B2 | | 12/2009 | Shakespeare et al. |

(Continued)

FOREIGN PATENT DOCUMENTS

| JP | 54054095 A | 4/1979 |
| JP | 58055839 A | 4/1983 |

(Continued)

OTHER PUBLICATIONS

Kroll, Dan; King, Karl, Laboratory and Field Evaluation of a Dual Use On-Line Monitoring System for Enhancing Water Distribution System Quality and Security [Abstract]. In: Proceedings of SPIE—The International Society for Optical Engineering (2005), 5994 (Chemical and Biological Sensors for Industrial and Environmental Security), 59940C/1-59940C/12 CODEN: PSISDG; ISSN: 0277-786X, 1 page.

(Continued)

*Primary Examiner* — Neil N Turk
(74) *Attorney, Agent, or Firm* — Fredrikson & Byron, P.A.

(57) ABSTRACT

An optical sensor determines a characteristic of a fluid medium based on a plurality of detector outputs and a characteristic model. The optical sensor directs light into the fluid medium, detects light at each of a plurality of wavelengths transmitted through the fluid medium, and produces therefrom the plurality of detector outputs. The characteristic model provides an estimate of the characteristic of the fluid medium based on a partial least squares analysis of optical transmission measurements through at least one reference fluid medium having a known characteristic.

13 Claims, 13 Drawing Sheets

(56) References Cited

U.S. PATENT DOCUMENTS

| | | | |
|---|---|---|---|
| 7,671,994 | B2 | 3/2010 | Shakespeare et al. |
| 2008/0285012 | A1* | 11/2008 | Shakespeare et al. .......... 356/51 |
| 2009/0219513 | A1 | 9/2009 | Shakespeare et al. |
| 2011/0040494 | A1* | 2/2011 | Foster ............... G01J 3/42 702/25 |

FOREIGN PATENT DOCUMENTS

| | | |
|---|---|---|
| JP | 1141351 A | 6/1989 |
| JP | 2000221165 A | 8/2000 |
| JP | 2003130792 A | 5/2003 |
| WO | WO1994018543 A1 | 8/1994 |
| WO | WO1996018096 A1 | 6/1996 |

OTHER PUBLICATIONS

Dean, Warren, In Situ Analysis of Trace Moisture in Chlorine Gas Streams Using a Tunable Diode Laser [Abstract]. In: Proceedings of the Annual ISA Analysis Division Symposium (2006), 51st, 1-8 CODEN: ANDIEY; ISSN 1050-6527, 1 page.

Jang, A.M.; Szabo, Jeffrey; Hosni, Ahmed A.; Coughlin, Michael; Bishop, Paul L., Meaurement of Chlorine Dioxide Penetration in Dairy Process Biofilms During Disinfection [Abstract]. In: Applied Microbiology and Biotechnology (2006), 72(2), 368-376 CODEN: AMBIDG; ISSN: 0175-7598, 1 page.

Watanabe, Nobushia; Takakura, Akito; Minami, Yoshitaka; Mizutani, Satoshi; Takatsuki, Hiroshi, Correction os Low-Volatile Organic Chlorine (LVOCI) and PCDD/FS in Various Municipal Waste Incinerators (MWIs) [Abstract]. In: Chemosphere (2007, 67(9), S198-S204 CODEN: CMSHAF; ISSN: 0045-6535, 1 page.

Helbling, Damian E.; Van Briesen, Jeanne M., Real-Time Monitoring of Free Chlorine Response to Microbial Contamination in a Model Distribution System [Abstract]. In: Preprints of Extended Abstracts presented at the ACS National Meeting, American Chemical Society, Division of Environmental Chemistry (2007), 47(2), 816-820 CODEN: PEACF2; ISSN: 1524-6434, 1 page.

Zhang, Yong-liang; Zheng Shi-ying, The Effects of Air Sterilization Using Chlorine Dioxide in Different Rooms [Abstract]. In: Huanjing Yu Zhiye Yixue (2007), 24(3), 337-338 CODEN: HYZYA2, 1 page.

Helbling, Damian E.; VanBriesen, Jeanne M., Continuous Monitoring of Residual Chlorine Concentrations in Response to Controlled Microbial Intrusions in a Laboratory-Scale Distribution System [Abstract]. In: Water Research (2008), 42 (12), 3162-3172 CODEN: WATRAG; ISSN: 0043-1354, 1 page.

Xie, Xiezhong; Zhang, Yulei, Application of Chlorine Ion Monitoring in Boiler Water Treatment [Abstract]. In: Gongye Yongshui Yu Feishui (2008), 39(1), 75-77 CODEN: GYYFAV; ISSN: 1009-2455, 1 page.

Badalyan, Alexander; Buff, Joachim; Holmes, Mike; Chow, Christoperh W.K.; Vitanage, Dammika, On-Line Free-Chlorine/Total-Chlorine Monitors' Evaluation—A Step Towards a Correct Choice of Residual Disinfectant Monitor [Abstract]. In: Journal of Water Supply: Research and Technology—AQUA (2009), 58(3), 181-190 CODEN: JWSAFA, 1 page.

Kroll, Dan; King, Karl; Laboratory and Flow Loop Validation and Testing the Operational Effectiveness of an On-line Platform for the Water Distribution System [Abstract]. In: Water Distribution Systems Analysis Symposium 2006, American Society of Civil Engineers, Reston, VA 20191-4400 USA, v 247, p. 1-16, 2006, presented at Annual Water Distribution Analysis Symposium, OH (USA), Aug. 27-30, 2006, 1 page.

M. Belz et al., Smart-Sensor Approach for a Fibre-Optic-Based Residual Chlorine Monitor, Sensors and Actuators B 38-9 (1997) p. 380-385.

English Abstract, JP2003130792A, published May 8, 2003, 1 page.
English Abstract, JP54054095A, published Apr. 27, 1979, 1 page.
English Abstract, JP1141351A, published Jun. 2, 1989, 1 page.
English Abstract, JP58055839A, published Apr. 2, 1983, 1 page.
English Abstract, JP2000221165A, published Aug. 11, 2000, 1 page.

Abdi, Nerve, "Partial Least Squares (PLS) Regression." In: Lewis-Beck M., Bryman A, Futing, T. (Eds.) (2003). Encyclopedia of Social Sciences Research Methods. Thousand Oaks (CA): Sage, pp. 1-7.

Tobias, Randall, et al., "An Introduction to Partial Least Squares Regression," SAS Institute Inc., Cary, North Carolina, Oct. 19, 2007, printed Apr. 27, 2011 from http://support.sas.com/techsup/technotens509.pdf, pp. 1-8.

Haenlein, Michael, "A Beginner's Guide to Partial Least Squares Analysis," Understanding Statistics, 3(4), 283-297, Copyright 2004, Lawrence Erlbaum Associates, Inc., pp. 283-298.

Applied Analytics, Inc., "A UV-VIS Diode Array Fiber Optics Process Analyzer," 2004, 2 pages.

Kang, Doo Sun, Real-Time Demand Estimation for Water Distribution Systems [Abstract]. In: DAI, Suppl. B., v.69, 2008, 2 pages.

Dhaliwal, B.; Snyder, J.; Williams, G., How to Calibrate a Chlorine Residual Analyzer [Abstract]. In: Operations Forum vol. 3, No. 3, p. 16-19, Mar. 1986. 4 fig, 1 page.

Finger, R.E.; Harrington, D.; Paxton, L.A., Development of an On-Line Zero Chlorine Residual Measurement and Control System [Abstract]. In: Water Pollution Control Federation Journal JWPFA, vol. 57, No. 11, p. 1068-1073, Nov. 1985, 5 fig, 2 tab, 18 ref, 1 page.

Nutt, S.G.; Jeffers, E.L.; Vachon D.T., Bench Testing of On-Line Total Residual Chlorine Analyzers [Abstract]. In: Journal of the Water Pollution Control Federation JWPFA, vol. 57, No. 9, p. 948-954, Sep. 1985, 5 fig, 4 tab, 9 ref, 1 page.

Richard, Y.; Brener, L., Measurement and Regulation of Ozone in the Presence of Chlorine [Abstract]. In: Analytical Aspects of Ozone Treatment of Water and Wastewater, Lewis Publishers, Chelsea, MI, 1986, p. 201-222, 13 fig, 9 ref, 1 page.

Noss, C.I.; Isaac, R., Disinfection [Abstract]. In: Journal-Water Pollution Control Federation JWPFA5, vol. 61, No. 6, p. 834-839, Jun. 1989, 92 ref, 1 page.

Johnson, J.D.; LeCloirec, C.; Jenson, J.N., Measurement of Chlorine Residuals in Chlorinated Cooling Waters: Effect of Organic Nitrogen [Abstract]. In: Water Chlorination: Chemistry, Environmental Impact and Health Effects. vol. 6. Proceedings of the Sixth Conference on Water Chlorination: Environmental Impact and Health Effects, Oak Ridge, Tennessee, May 3-8, 1987. Lewis Publishers, Inc., Chelsea, Michigan, 1989, p. 535-544, 2 fig, 4 tab, 14 ref. EPRI Grant No. RP2300-7, 1 page.

Cooper, W.J.; Pacey, G.E.; Gordon, G., Current Status of Disinfectant Residual Measurement Methods for Free and Combined Chloride and Oxychlorine Species [Abstract]. In: Water Chlorination: Chemistry, Environmental Impact and Health Effects. vol. 6. Proceedings of the Sixth Conference on Water Chlorination: Environmental Impact and Health Effects, Oak Ridge, Tennessee, May 3-8, 1987. Lewis Publishers, Inc., Chelsea, Michigan, 1989, p. 29-45, 1 fig, 27 ref, 1 page.

Briggs, R; Grattan, K.T.V.; Mouaziz, Z.; Elvidege, A.F., On-Line Monitoring of Residual Chlorine. In: Instrumentation, Control and Automation of Water and Wastewater Treatment and Support Systems. Proceedings of the 5th IAWPRC Workshop held in Yokohama and Kyoto, Japan, Jul. 26-Aug. 3, 1990. Pergamon Press, New York, 1990, pp. 39-49.

Ward G, Use of ICA for Water Treatment and Water Quality Monitoring [Abstract]. In: Water Supply, vol. 12, No. 1-2 pp. IR8-6-IR8-8. Conference: 19 Int. Water Supply Congress and Exhibition, Budapest, Hungary, Oct. 2-8, 1993, 1 page.

Eddington, G., Plant Meets Stringent Residual Chlorine Limit [Abstract]. In: Water Environment & Technology WAETEJ, vol. 5, No. 6, p. 11-12, Jun. 1993, 1 page.

Solymosi, G.C., Intelligent, Microprocessor-Based Amperometric Analyser Enables Part Per Billion Chlorine Residual Monitoring and Control [Abstract]. In: Proceedings of the IWSA International Specialized Conference on Disinfection of Potable Water, 1995, pp. 195-202, Water Supply, vol. 13, No. 2, 1 page.

Archenault, M.; Chatre, M.; Levi, Y.; Wable, O.; Petillot, F., Application of the Chlorine Amperometric Microsensor "Chlorscan

(56) References Cited

OTHER PUBLICATIONS

Registered VD" for the Monitoring of Drinking Water [Abstract]. In: Techniques Sciences Methodes. Genie Urbain-Genie Rural, No. 5, pp. 327-333, 1996, 1 page.
Hayer, F.; Wagner, P.; Pihan, J.C., Monitoring of Extractable Organic Halogens (EOX) in Chlorine Bleached Pulp and Paper Mill Effluents Using Four Species of Transplanted Aquatic Mollusks [Abstract]. In: Chemosphere, v 33, n. 11, p. 2321-2334, Dec. 1993, 1 page.
McPherson, L., Chlorine Control: Controlling the Addition of Chlorine into a Process [Abstract]. In: Water Engineering & Management, v 146, n. 7, p. 30-34, Jul. 1999, 1 page.
Heraud, J.; Kiene, L.; Detay, M.; Levi, Y., Optimised Modelling of Chlorine Residual in a Drinking Water Distribution System with a Combination of On-Line Sensors [Abstract]. In: Aqua—Journal of Water Supply: Research and Technology, v 46, n. 2, p. 59-70, Apr. 1997, 1 page
Kim, Yong H.; Hensley, R., Effective Control of Chlorination and Dechlorination at Wastewater Treatment Plants Using Redox Potential [Abstract]. In: Water Environment Research, v 69, n. 5, p. 1008-1014, Aug. 1997, 1 page.
Gobet, J.; Rychen, P.; Madore, C.; Skinner, N.; van Buel, H.; Jaggi, F., Development of an On-Line Chlorine Sensor for Water Quality Monitoring in Public Distribution Networks [Abstract]. In: Water Science & Technology: Water Supply, v 1, n2, p. 211-215, 2001. Conference: International Conference on Water Supply and Water Quality, Poland (Krakow), Sep. 11-13, 2000, 1 page.
Gobet, J.; Rychen, Ph.; Cardot, F.; Santoli, E., Microelectrode Array Sensor for Water Quality Monitoring from Automation in Water Quality Monitoring [Abstract]. In: Water Science & Technology, v 47, n. 2, p. 127-134, 2003. Conference: IWA International Conference on Automation in Water Quality Monitoring, Vienna, Austria, May 21-22, 2002, 1 page.
Ostfeld, A., A Review of Modeling Water Quality in Distribution Systems [Abstract]. In: Urban Water Journal, v 2, n. 2, p. 107-114, Jun. 2005, 1 page.
Mehta, A.; Shekhar, H.; Hyun, S.H.; Hong, S.; Cho, H.J., A Micromachined Electrochemical Sensor for Free Chlorine Monitoring in Drinking Water [Abstract]. In: Instrumentation, Control and Automation for Water and Wastewater Treatment and Transport Systems IX, Water Science & Technology, v 53, n. 4-5, p. 403-410, 2006. Conference: IWA Int'l Conf. on Instrumentaiton, Control and Automation for Water and Wastewater Treatment and Transport Systems, Korea, 2005, 1 page.
Jiang, Y.; Xu, J.; Xu, F., On Stability of Chlorine in Drinking Water [Abstract]. In: Water Purification Technology, v 24, n. 5, 2005, 1 page.
Gouveia, C.; Nicolau, R.; Ferreria, F.; Caamara, A., Collaborative Monitoring of Chlorine Flavours in Drinking Water, Off-Flavours in the Aquatic Environment VII [Abstract]. In: Water Science & Technology, v 55, n. 5, p. 77-84, 2007. Conference: 7. Int'l Sym. on Off-Flavours in the Aquatic Environment, Canada, Oct. 2-7, 2005, 1 page.
Yu, R.F.; Chen, H.W.; Cheng, W.P.; Shen, Y.C., Application of pH-ORP Titration to Dynamically Control the Chlorination and Dechlorination of Wastewater Reclamation [Abstract]. In: Desalination, v. 244, n. 1-3, p. 164-176, Aug. 2009, 1 page.
Badalyan, A.; Buff, J.; Holmes, M.; Chow, C.W.K.; Vitanage, D., On-Line Free-Chlorine/Total-Chlorine Monitors' Evaluation—A Step Towards a Correct Choice of Residual Disinfectant Monitor [Abstract]. In: Aqua-Journal of Water Supply: Research and Technology, v 58, n. 3, p. 181-190, May 2009, 1 page.
Helbling, D.E.; VanBriesen, J.M. Propagation of Chlorine Demand Signals Induced by Contaminants in a Drinking Water Distribution [Abstract]. In: Proceedings of World Environmental and Water Congress 2009, v 342, p. 1-10, 2009, 1 page.
Kumar, Jitendra; Downey, Brill E.; Mahinthakumar, G.; Ranjithan, Ranji. Characterizing Reactive Contaminant Sources in a Distribution System [Abstract]. In: Proceedings of World Environmental and Water Congress 2009, v 342, p. 1-6, 2009, 1 page.
Kroll, Dan; King, Karl. Real World Operational Testing and Deployment of On-Line Water Security Monitoring System [Abstract]. In: Water Distribution Systems Analysis Symposium 2006, v 247, p. 1-10, 2006, 1 page.
Mellor, J.W. Over the Coalescence of Hydrogen and Chlorine [Abstract]. In: Proceedings Chem. Soc. (1901), 16, 221-22. From Chem. Zentr., 1901, 1, 358-359, 1 page.
Saltzman, Robert S. Continuous Monitoring for Control of Chlorine Dioxide Generators [Abstract]. In: Advances in Instrumentation (1975), 30, Pt. 2, 609, 4 pp. CODEN: AVINBP; ISSN: 0065-2814, 1 page.
Mouaziz, Z.; Briggs, R.; Hamilton, I.; Grattan, K.T.V. Design and Implementation of a Fiber-Optic-Based Residual Chlorine Monitor [Abstract]. In: Sensors and Acutators, B: Chemical (1993), B11 (1-3), 432-40 CODEN: SABCEB; ISSN: 0925-4005, 1 page.
Sato, Tatsuji; Kitamura, Naoya; Kudo, Hisashi. Development of New Residual Chlorine Monitor [Abstract]. In: GS News Technical Report (1994), 53(1), 36-43 CODEN: GSNTAA; ISSN: 0385-7204, 1 page.
Walter, Wendy K.; Manolopoulos, David E.; Jones, Robert G. Chlorine Adsorption and Diffusion on Cu (111) [Abstract]. In: Surface Science (1996), 348 (1/2), 115-32 CODEN: SUSCAS; ISSN: 0039-6028, 1 page.
Chen, Xiao; Stewart, Philip S. Chlorine Penetration into Articial Biofilm Is Limited by a Reaction-Diffusion Interaction [Abstract]. In: Environmental Science and Technology (1996), 30(6), 2078-83 CODEN: ESTHAG; ISSN: 0013-936X, 1 page.
Lindsay, Mitch; Graziano, Michael, McMorris, Regan. Field Performance of an Ion Mobility Monitor for Chlorine in Ambient Air [Abstract]. In: Proceedings, Annual Meeting—Air & Waste Management Association (1996), 89th, ta3003/1-ta3003110 CODEN: PAMEE5; ISSN: 1052-6102, 1 page.
Gobet, J.; Neuman, V.; Metzler, P.; Santoli, E.; Sollberger, F.; Rohner, C.; Madore, C.; Tang, X.M.; Skinner, N. Sensors for On-Line Water Quality Monitoring [Abstract]. In: INTERKAMA ISA Tech Conference: Technology Update, Duesseldorf, Oct. 18-20, 1999 (2000), Meeting Date 1999, 48--51. Publisher: Instrument Society of America, Resarch Triangle Park, N.C. CODEN: 68LVAC, 1 page.
Kopchynski, David M.; Palmer, Tony M.; Ross, Maureen C.; Nutt, Stephen G. Comparisons of On-Line ORP and Chlorine Residual Monitoring/Control Systems for Wastewater Treatment Plant Final Effluent Chlorination [Abstract]. In: Conference Proceedings—Water Environment Federation Annual Conference & Exposition, 74th, Atlanta, GA, Oct. 13-17, 2001 (2001), 4275-4295. Publisher: Water Environment Federation, Alexandria, VA. CODEN: 69DFE3, 1 page.
Munavalli, G.R.; Kumar, M.S. Mohan. Source Strength Identification of Chlorine in a Distribution System Under Dynamic State [Abstract]. In: Journal of Indian Water Works Association (2005), 37(1), 53-61 CODEN: JIWAEX; ISSN: 0970-275X, 1 page.
Efimov, A.V.; Litvinenko, I.I.; Melashchencko, I.A.; Kavertsev, V.L. Study of Electrochemical Characteristics and Improvement of Gas Analyzers of Chlorine During Their Use at Thermal Electric Power Plants [Abstract]. In: Vestnik Natsional'nogo Tekhnicheskogo Universiteta "KhPI" (2002), (9, 1), 27-32 CODEN: VNTUSA3, 1 page.
Chaves, Gustavo Adolfo; Rojas, Ivan Dario Median; De Colmeares, Beatriz Galvis; Mercado, Marcela; Carrascal, Ana Karina. Production of Electrolyzed Water for Removing Microorganisms in Lettuce [Abstract]. In: Universitas Scientiarum (Pontificia Universidad Javeriana, Facultad de Ciencias) (2004), 9 (Especial), 91-100 CODEN: USNCAB; ISSN: 0122-7483, 1 page.

\* cited by examiner

PLS Model

| Factor | Conc Coeff | pH Coeff |
|---|---|---|
| Constant | -0.66 | 9.100 |
| W230 | -1265.0302 | -165.2358 |
| W236 | 2749.9898 | 145.3333 |
| W257 | -1760.7843 | 15.4442 |
| W296 | 600.9466 | -2.9047 |

PLS Concentration = -0.66 + (-1265.0302*W230) + (2749.9898*W236) + (-1760.7843*W257) + (600.9466*W296)

PLS pH = 9.1 +(-165.2358*W230) + (145.3333*W236) + (15.4442*W257) + (-2.9047*W296)

W230 = absorbance at 230nm
W236 = absorbance at 236nm
W257 = absorbance at 257nm
W296 = absorbance at 296nm

FIG. 9

FLUID PROPERTY DETERMINATION BASED ON PARTIAL LEAST SQUARES ANALYSIS

FIELD

This disclosure relates to an optical sensor and, more particularly, to the use of an optical sensor to determine a fluid characteristic.

BACKGROUND

Aqueous cleaning solutions are used in a variety of situations. For example, in different applications, aqueous cleaning solutions are used to clean, sanitize, and/or disinfect kitchens, bathrooms, schools, hospitals, factories, and other similar facilities. Aqueous cleaning solutions typically include one or more chemical species dissolved in water. The chemical species impart various functional properties to the water such as cleaning properties, antimicrobial activity, and the like.

Ensuring that an aqueous cleaning solution is appropriately formulated for an intended application can help ensure that the cleaning solution provides suitable cleaning and/or disinfecting properties. For example, the sterilizing ability of some aqueous cleaning solutions varies according to temperature, pH, and the concentration of chemical species dissolved in water, among other factors. Accordingly, measuring the different characteristics of the aqueous cleaning solution before use can be beneficial to understand the properties of the solution and to determine if adjustment is required. While chemical titration or other invasive techniques can be used to determine some properties of an aqueous cleaning solution, these techniques are typically laborious and prone to error. Further, these techniques do not always allow for rapid analysis of an aqueous cleaning solution, which would be helpful for time sensitive applications.

SUMMARY

In general, this disclosure is directed towards optical sensors and optical-based techniques for determining a characteristic of a fluid solution such as, e.g., an aqueous cleaning solution. In some examples, the techniques include determining an unknown characteristic in a test solution using a model that is based on a partial least squares analysis of transmission measurements through one or more reference solutions having a known characteristic (e.g., pH, concentration). For example, during development of the characteristic model, the partial least squares analysis may establish a relationship between one or more known characteristics and optical transmission measurements. The relationship can then be employed with transmission measurements subsequently taken on a sample with an unknown characteristic to determine an estimate of the unknown characteristic.

In one example according to the disclosure, a method is described that includes directing light into a fluid medium, detecting light at each of a plurality of wavelengths transmitted through the fluid medium and producing therefrom a plurality of detector outputs, and determining a characteristic of the fluid medium based on the plurality of detector outputs and a characteristic model. According to the example, the characteristic model provides an estimate of the characteristic of the fluid medium based on a partial least squares analysis of optical transmission measurements through at least one reference fluid medium having a known characteristic.

In another example, a sensor is described that includes an emitter that directs light into a fluid medium, a detector that detects light at each of a plurality of wavelengths transmitted through the fluid medium and produces therefrom a plurality of detector outputs, and a controller that determines a characteristic of the fluid medium based on the plurality of detector outputs and a characteristic model. In the example, the characteristic model provides an estimate of the characteristic of the fluid medium based on a partial least squares analysis of optical transmission measurements through at least one reference fluid medium having a known characteristic.

In another example, a system is described that includes an electrolytic cell and an optical sensor. The electrolytic cell is configured to generate an anolyte stream and a catholyte stream. The optical sensor includes an emitter that directs light into at least one of the anolyte stream or catholyte stream, a detector that detects light at each of a plurality of wavelengths transmitted through the at least one of the anolyte stream or catholyte stream and produces therefrom a plurality of detector outputs, and a controller that determines a characteristic of the at least one of the anolyte stream or catholyte stream based on the plurality of detector outputs and a characteristic model. In the example, the characteristic model provides an estimate of the characteristic of the at least one of the anolyte stream or catholyte stream based on a partial least squares analysis of optical transmission measurements through at least one reference solution having a known characteristic.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are not to scale (unless so stated) and are intended for use in conjunction with the explanations in the following detailed description. Examples of the present invention will hereinafter be described in conjunction with the appended drawings, wherein like numerals denote like elements.

FIG. 9 is an image of an example characteristic model showing example determined model constants and model coefficients.

DETAILED DESCRIPTION

Figure 1:
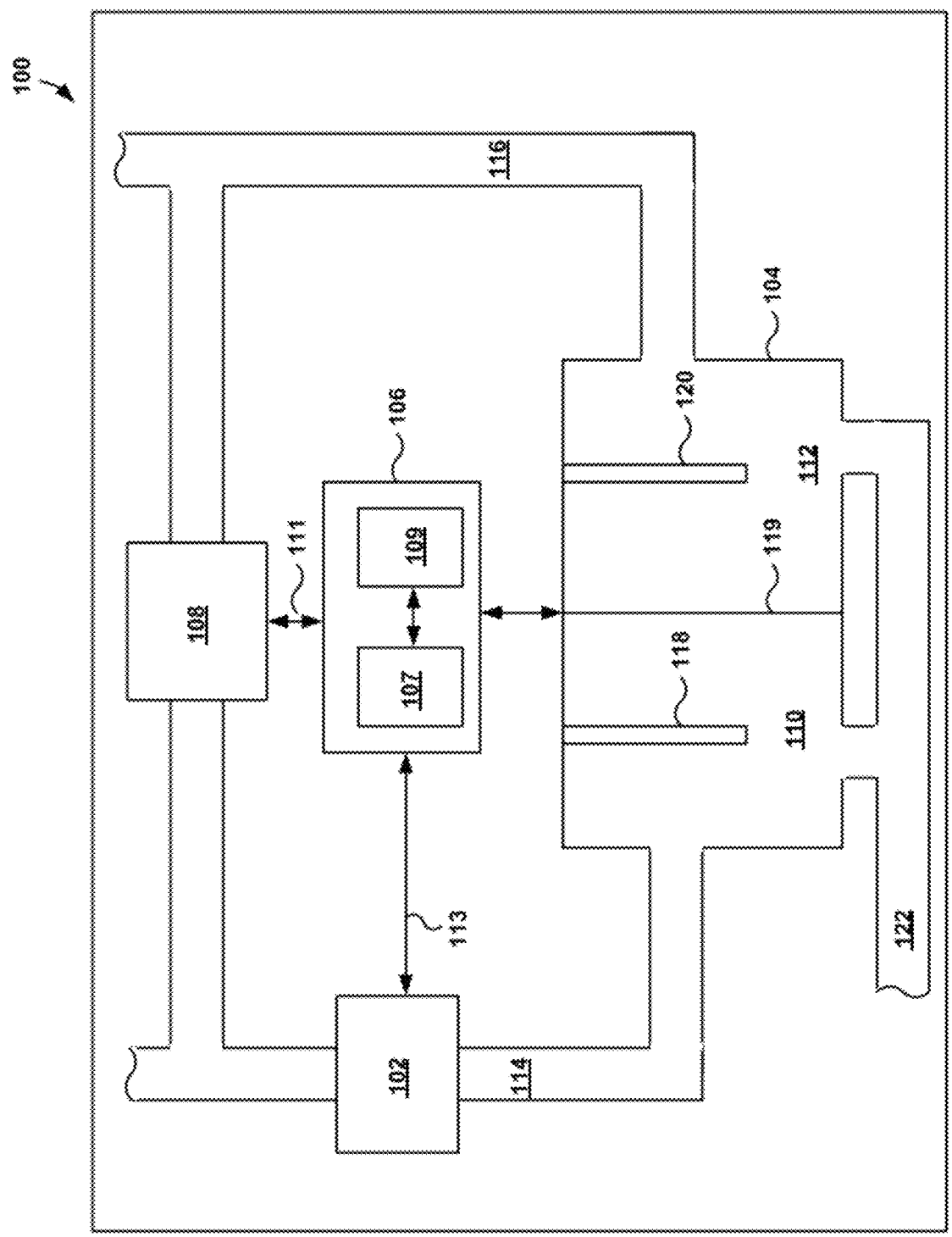
FIG. 1 is a diagram illustrating an example fluid system that includes an optical sensor according to examples of the disclosure.

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Fluid solutions are used in a variety of different industries for a variety of different applications. For example, in the cleaning industry, fluid solutions that include chlorine are often used to clean and disinfect various surfaces and equipment. In these solutions, the chemical form of the chlorine can affect the cleaning and disinfecting properties of the fluid solution. For instance, when chlorine is present as hypochlorous acid, hypochlorous acid generally exhibits increased antimicrobial activity over the conjugate base hypochlorite ion (e.g., sodium hypochlorite). Antimicrobial activity functions to kill or inhibit the growth of different microorganisms. By contrast, when chlorine is present as hypochlorite in a fluid solution, the solution may exhibit increased effectiveness as a detergent compared to when chlorine is present as hypochlorous acid. Accordingly, ensuring that a fluid solution is appropriately formulated for an intended application can help ensure that the fluid solution provides suitable cleaning and disinfecting properties in subsequent use.

This disclosure describes an optical sensor for determining a characteristic of a fluid medium (also referred to herein as a "fluid solution" or "fluid"). In particular, this disclosure describes methods, systems, and apparatuses related to an optical sensor that may be used to determine a characteristic of a fluid medium. The optical sensor can be used to determine one or more characteristics of the fluid medium such as, e.g., pH, the concentration of one, two, or more chemical species, or the like. For instance, in one example, the optical sensor directs light into the fluid medium, detects light at each of a plurality of wavelengths transmitted through the fluid medium to produce a plurality of detector outputs, and then determines a pH of the fluid medium based on the plurality of detector outputs. In another example, the optical sensor directs light into the fluid medium, detects light at each of a plurality of wavelengths transmitted through the fluid medium to produce a plurality of detector outputs, and then determines both a pH and a concentration of a chemical species of the fluid medium based on the plurality of detector outputs.

Independent of the specific characteristics of the fluid medium determined by the optical sensor, in some examples, the optical sensor determines a characteristic using a characteristic model (e.g., pH model, concentration model). The characteristic model may be based on a partial least squares analysis of transmission measurements through one or more reference solutions having a known characteristic (e.g., pH, concentration). For example, during development of the characteristic model, the partial least squares analysis may establish a relationship between the known characteristic and transmission measurements. The relationship can then be employed with transmission measurements subsequently taken on a sample with an unknown characteristic to determine an estimate of the unknown characteristic.

Example optical sensors and sensing methods will be described in greater detail below with respect to FIGS. 3-11. However, an example fluid system including an example electrolytic cell and optical sensor will first be described with respect to FIG. 1.

FIG. 1 is a conceptual diagram illustrating an example fluid system 100, which may be used to produce on-site cleaning and/or sanitizing fluid solutions. Fluid system 100 includes optical sensor 102, electrolytic cell 104, controller 106, and pump 108. Electrolytic cell 104 includes an anode compartment 110 and a cathode compartment 112 for generating an anolyte solution and a catholyte solution, respectively. Optical sensor 102 is optically connected to fluid pathway 114 exiting anode compartment 110 and is configured to determine one or more characteristics of the anolyte solution traveling through the fluid pathway. In operation, optical sensor 102 communicates the determined characteristic to controller 106, and controller 106 controls fluid system 100 based on the determined characteristic.

Controller 106 is communicatively connected to optical sensor 102, electrolytic cell 104, and pump 108. Controller 106 includes processor 107 and memory 109. Controller 106 communicates with pump 108 via a connection 111. Signals generated by optical sensor 102 are communicated to controller 106 via a wired or wireless connection, which in the example of FIG. 1 is illustrated as wired connection 113. Memory 109 stores software for running controller 106 and may also store data generated or received by processor 107, e.g., from optical sensor 102. Processor 107 runs software stored in memory 109 to manage the operation of system 100.

Electrolytic cell 104 electrolyzes an electrolytic solution under the control of controller 106. Electrolytic cell 104 includes an anode 118 in anode compartment 110 and a cathode 120 in cathode compartment 112. Anode 118 and cathode 120 are separated by membrane 119. In various examples, electrolytic cell 104 may be a diaphragm cell, bipolar cell, membrane cell, mercury cell, or any other suitable electrolytic cell.

In the example of FIG. 1, electrolytic cell 104 is configured to electrolytically generate chlorine and an alkali metal hydroxide. In operation, an electrolytic solution that includes an alkali metal chloride such as, e.g., potassium chloride or sodium chloride enters electrolytic cell 104 through fluid pathway 122. Electrical current is thereafter controllably directed through the electrolytic solution in electrolytic cell 104 to generate chlorine and a alkali metal hydroxide. When the electrolytic solution includes sodium chloride, the reaction proceeds according to the following general equation:

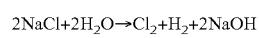

Chlorine is formed at anode 118 in anode compartment 110 and exits electrolytic cell 104 through fluid pathway 114. The alkali metal hydroxide and hydrogen are formed at or near cathode 120 in cathode compartment 112 and exit electrolytic cell 104 through fluid pathway 116.

As will be described in greater detail below, the diatomic chlorine formed at anode 118 may dissolve in the aqueous anolyte solution to form hypochlorous acid (HOCl) and/or hypochlorite ions ($^-$OCl). In general, when diatomic chlorine dissolves in an aqueous solution, the diatomic chlorine is present in equilibrium with hypochlorous acid and hypochlorite ions. Changing the pH of the solution can shift the equilibrium so that either diatomic chlorine, hypochlorous acid, or hypochlorite ions becomes the dominate form of chlorine in the solution. In other words, changing the pH of the solution can shift the equilibrium reaction so that one or two of the chlorine species dominate over one or two of the other chlorine species, even though the other chlorine species may still be present in the solution.

In general, hypochlorous acid exhibits better antimicrobial properties than a solution of hypochlorite ions. Conversely, a solution of hypochlorite ions generally exhibits better detergent properties than hypochlorous acid. Accordingly, monitoring the anolyte solution flowing through fluid pathway 114 can help ensure that the anolyte solution has an appropriate formulation for a desired application.

In some examples, monitoring the pH of the anolyte solution flowing through fluid pathway 114 can help ensure that the anolyte solution has the appropriate chlorine species (e.g., hypochlorous acid or hypochlorite ions), as pH may dictate which chlorine species predominates in the equilibrium reaction. In some additional examples, monitoring the concentration of one or more chlorine species in the anolyte solution flowing through fluid pathway 114 can help ensure that the anolyte solution will provide appropriate chemical or biological activity for an intended application. Additional or different characteristics of the anolyte solution may also be monitored.

In the example of FIG. 1, fluid system 100 includes optical sensor 102 to monitor the anolyte solution. In this example, optical sensor 102 is configured to determine one or more characteristics of the anolyte solution flowing through fluid pathway 114. Example characteristics include, but are not limited to, pH, and the concentration of one or more chemical (e.g., chlorine) species. Sensor 102 communicates the detected characteristics to controller 106 via connection 113.

In response to receiving the detected characteristic, processor 107 of controller 106 may compare the detected characteristic to one or more thresholds stored in memory 109. Based on the comparison, controller 106 may adjust fluid system 100, e.g., so that the detected characteristic matches a target value for the characteristic. In some examples, controller 106 starts and/or stops pump 108 to adjust the pH of the anolyte solution flowing through fluid pathway 114. Starting pump 108 mixes comparatively basic catholyte solution (e.g., NaOH) with the anolyte solution to increase the pH of the anolyte solution. In some additional examples, controller 106 adjusts the concentration of electrolytic solution entering electrolytic cell 104 (e.g., by increasing or decreasing the concentration of an alkali metal salt in the solution) to adjust the concentration of one or more species in the electrolytic solution. In still other examples, controller 106 adjusts the electrical operation of electrolytic cell 104 to adjust a characteristic of the anolyte solution produced by the cell.

Optical sensor 102 may be implemented in a number of different ways in fluid system 100. In the example shown in FIG. 1, optical sensor 102 is positioned in-line with fluid pathway 114 to determine a characteristic of the anolyte solution flowing through the fluid pathway. Optical sensor 102 may be positioned in other locations to detect characteristics of other fluid solutions in addition to or in lieu of the anolyte solution flowing through fluid pathway 114. For instance, in some examples, optical sensor 102 is positioned to detect a characteristic of the catholyte fluid flowing through fluid pathway 116 and/or an electrolytic solution flowing through fluid pathway 122 in addition to or in lieu of the anolyte solution flowing through fluid pathway 114.

In addition, in some examples, optical sensor 102 is implemented as a non-invasive, on-line monitoring tool for monitoring one or more characteristics of the anolyte solution generated by electrolytic cell 104. In other examples, optical sensor 102 is implemented as an off-line monitoring tool for monitoring one or more characteristics of the anolyte solution generated by electrolytic cell 104. In such an example, a sample of anolyte solution may be taken from fluid pathway 114 and evaluated using one or more devices that, either alone or in combination, embody the techniques of optical sensor 102.

Fluid system 100 includes pump 108. Pump 108 may be any form of pumping mechanism that supplies fluid to be mixed with anolyte solution. For example, pump 108 may comprise a peristaltic pump or other form of continuous pump, a positive-displacement pump, or other type of pump appropriate for the particular application. In some applications, as illustrated in the example of FIG. 1, pump 108 draws comparatively alkaline catholyte solution and delivers it to a comparatively acidic anolyte solution to increase the pH of the anolyte solution. In other examples, pump 108 draws comparatively alkaline solution from a different source such as, e.g., a tank, and delivers it to a comparatively acidic anolyte solution to increase the pH of the anolyte solution.

Fluid pathways in fluid system 100 (e.g., fluid pathways 114, 116, and 122) may be any type of flexible or inflexible tubing or piping. Depending on the application, fluid pathways 114, 116, and 122 (or a portion thereof) may be transparent or translucent. With a transparent or translucent fluid pathway, optical sensor 102 may be positioned to direct light directly through the fluid pathway, rather than extracting a sample (e.g., slip stream) from the fluid pathway for analysis.

Figure 2:
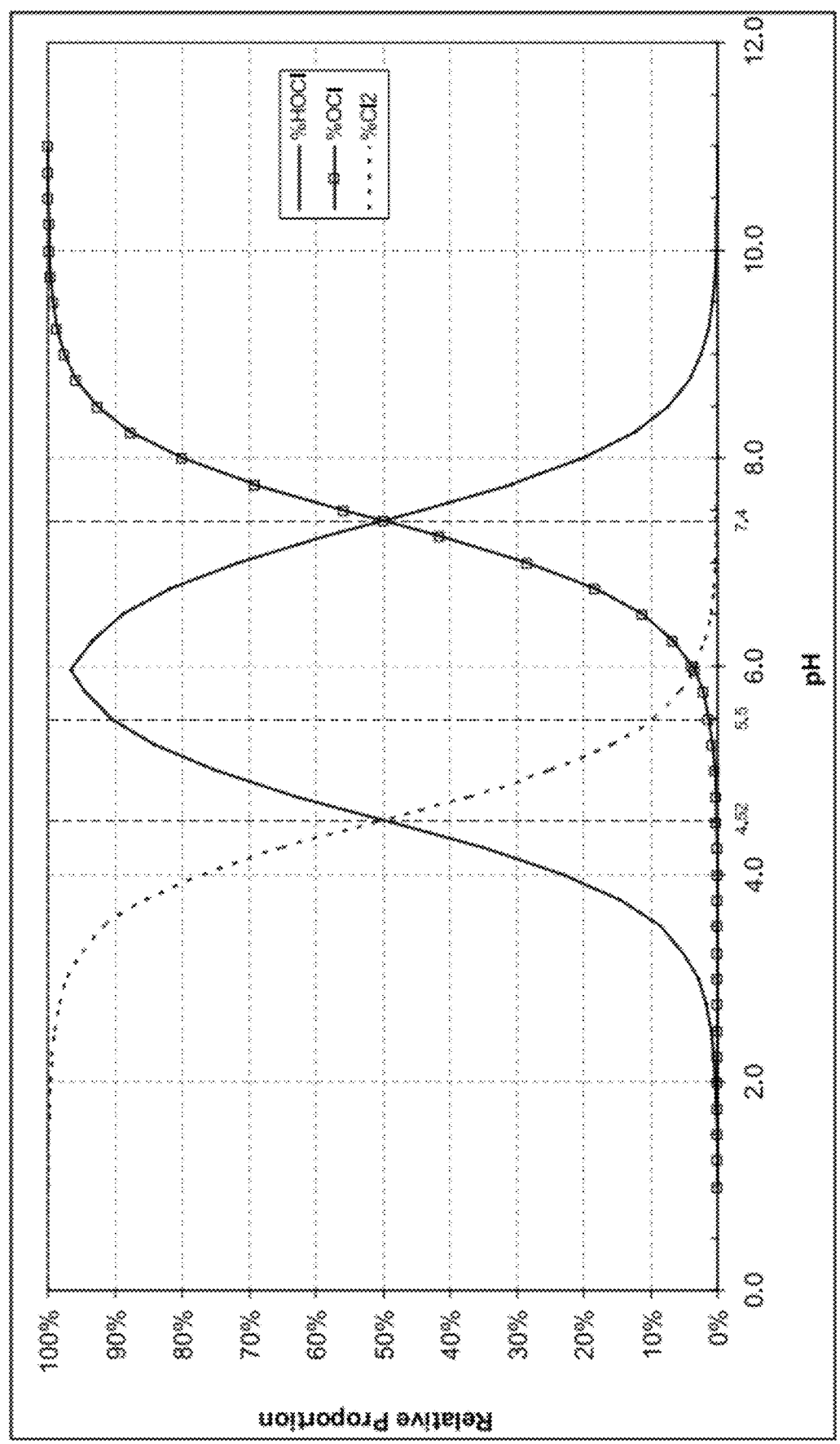
FIG. 2 is a plot of relative proportions of different chlorine species versus pH for an example hypochlorous acid solution.

As briefly discussed above, the pH of the anolyte solution flowing through fluid pathway 114 may dictate the suitably of the fluid solution for certain cleaning and/or sanitizing applications. This is because the pH of the anolyte solution may dictate the primary species of chlorine that exists in the solution. FIG. 2 is a plot of the relative proportion of different chlorine species versus pH for an example hypochlorous acid solution.

As seen in the example plot of FIG. 2, diatomic chlorine is the dominate species of chlorine at pH values below approximately 4.52, while hypochlorous acid is the dominate species of chlorine between pH values of approximately 4.52 and approximately 7.4. At pH values above approximately 7.4, hypochlorite (e.g., sodium hypochlorite) is the most dominate species of chlorine.

Hypochlorous acid is generally considered to have superior antimicrobial activity over an alkali metal hypochlorite. Therefore, for antimicrobial compositions, it may be desirable for the anolyte flowing through fluid pathway 114 to have a pH between approximately 4.52 and approximately 7.4 such as, e.g., between 5.5 and 6.5. By contrast, for detergent compositions, it may be desirable for the anolyte flowing through fluid pathway 114 to have a pH greater than approximately 7.4 such as, e.g., a pH greater than 9.0.

Figure 3:
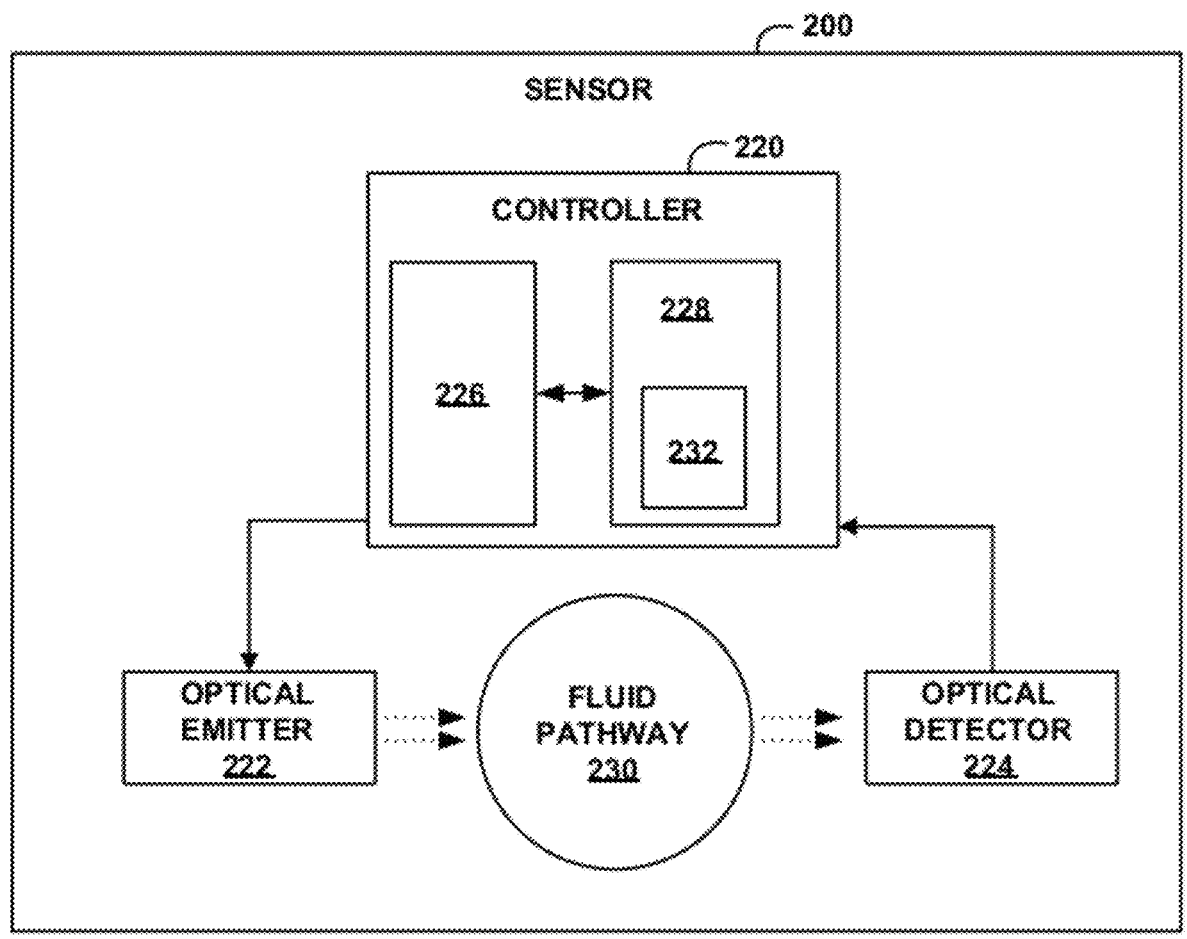
FIG. 3 is a block diagram illustrating an example optical sensor that may be used in the example fluid system of FIG. 1.

In the example of FIG. 1, optical sensor 102 determines a characteristic of the anolyte flowing through fluid pathway 114 (e.g., pH, concentration, or the like) and controller 106 controls fluid system 100 based on the determined characteristic and, e.g., a target characteristic stored in memory 109. FIG. 3 is block diagram illustrating an example of a sensor 200 that determines a characteristic of a fluid medium. Sensor 200 may be used as optical sensor 102 in fluid system 100, or sensor 200 may be used in other applications beyond fluid system 100. For example, sensor 200 may be used in any application to determine a characteristic that includes one or more (e.g., multiple) chemical species in equilibrium. The one or more chemical species may include on or more halide species such as, e.g., one or more chlorine species or one or more bromine species, although other chemical species are also contemplated.

With reference to FIG. 3, sensor 200 includes a controller 220, one or more optical emitters 222 (referred to herein as "optical emitter 222"), and one or more optical detectors 224 (referred to herein as "optical detector 224"). Controller 220 includes a processor 226 and a memory 228. Optical emitter 222 directs light into fluid pathway 230 and optical detector 224 receives transmitted light on the opposite side of the fluid pathway. The components of sensor 200 may be implemented on a single printed circuit board (PCB) or may be implemented using two or more PCB boards. Further, in some examples, sensor 200 communicates with external devices, such as controller 106 (FIG. 1).

Memory 228 stores software and data used or generated by controller 220. For example, memory 228 may store one or more characteristic models 232 (collectively referred to herein as "characteristic model 232") used by controller 220 to determine one or more characteristics of the fluid medium passing through fluid pathway 230. Characteristic model 232 provides an estimate of a fluid characteristic from light detected by optical detector 224. In some examples, characteristic model 232 is in the form of an equation that relates one or more fluid characteristics to light transmission measurements taken by optical detector 224.

For ease of description, characteristic model 232 is generally described below as a model that is determined by sensor 200 and stored in memory 228 of the sensor. In other examples, characteristic model 232 may be determined separately from sensor 200 (e.g., using a laboratory spectrophotometer and computing device) and stored in memory 228 and/or a separate computing device communicatively coupled to sensor 200. Therefore, although sensor 200 is described below as being configured to determine characteristic model 232 and further being configured to determine an unknown characteristic based on characteristic model 232, it should be appreciated that the disclosure is not limited to such an example sensor. In different examples, hardware and/or software operating outside of sensor 200 may be utilized to implement functions attributed to sensor 200 in this disclosure.

In examples in which sensor 200 determines characteristic model 232, the characteristic model may be based on an analysis of baseline detection values produced by optical detector 224 and processed by controller 220. The baseline detection values may be detected by optical detector 224 when one or more fluid solutions having a known characteristic of interest are passed through fluid pathway 230. These fluid solutions having a known characteristic of interest may be referred to as reference solutions. Upon receiving baseline detection values, processor 226 of controller 220 (or a processor of another computing device) can analyze the detection values to establish a relationship between the known characteristic and the detection values. For example, processor 226 may perform a partial least squares analysis to determine a relationship between the known characteristic and the detection values. The determined relationship can then be stored as characteristic model 232.

Processor 226 runs software stored in memory 228 to perform functions attributed to sensor 200 and controller 220 in this disclosure. Components described as processors within controller 220, controller 106, or any other device described in this disclosure may each include one or more processors, such as one or more microprocessors, digital signal processors (DSPs), application specific integrated circuits (ASICs), field programmable gate arrays (FPGAs), programmable logic circuitry, or the like, either alone or in any suitable combination.

Optical emitter 222 includes at least one optical emitter that emits radiation having a specified wavelength or wavelength range. In some examples, optical emitter 222 emits radiation over continuous range of wavelengths. In other examples, optical emitter 222 emits radiation at a plurality of discrete wavelengths. For example, optical emitter 222 may emit at two, three, four or more discrete wavelengths.

Optical emitter 222 can emit light at any suitable wavelength, as described in greater detail below. In one example, optical emitter 222 emits light within the ultraviolet (UV) spectrum. Light within the UV spectrum includes wavelengths in the range from approximately 10 nm to approximately 400 nanometers. Light emitted by optical emitter 222 propagates through fluid pathway 230 of sensor 200 and may be detected by optical detector 224. The amount of radiation detected by optical detector 224 depends on the contents of the fluid pathway running through sensor 200. If the fluid pathway contains a fluid solution that has certain properties (e.g., a certain pH and/or a certain concentration of chemical species), optical detector 224 will detect a certain level of radiation emitted from optical emitter 222. However, if the fluid solution has different properties (e.g., a different pH and/or a different concentration of the chemical species), optical detector 224 will detect a different level of radiation emitted from optical emitter 222.

Optical detector 224 includes at least one optical detector that detects radiation within associated wavelength ranges within the UV light spectrum. Optical detector 224 detects radiation that is emitted by optical emitter 222 and that has propagated through fluid pathway 230 and any fluid solution in the fluid pathway. Optical detector 224 may be implemented using multiple detectors, one for each wavelength or wavelength range, or may be implemented using a single detector such as, e.g., a detector that is programmable to detect multiple wavelength ranges.

Controller 220 controls the operation of optical emitter 222 and receives signals concerning the amount of light detected by optical detector 224. In some examples, controller 220 further processes signals, e.g., to develop characteristic model 232 and/or to determine a characteristic of a fluid solution passing through fluid pathway 230 using characteristic model 232. While controller 220 may perform various signal processing functionalities, as described herein, controller 220 need not be configured to perform any or all of the described functionalities. In different examples, signal processing, e.g., to develop characteristic model 232 and/or to determine a characteristic of a fluid solution based on characteristic model 232 may be performed outside of sensor 200. For example, controller 106 (FIG. 1) or another controller may perform one or more functions generally attributed to controller 220 in this disclosure. Accordingly, it should be appreciated that functions attributed to controller 220 herein are for ease of description, and the described functions may, in fact, be implemented within sensor 200 or within one or more separate devices, which may or may not be communicatively coupled to sensor 200.

In one example in which controller 220 processes signals, controller 220 controls optical emitter 222 and optical detector 224 to create characteristic model 232. When sensor 200 is informed of one or more known characteristics of a reference solution flowing through fluid pathway 230, controller 220 controls optical emitter 222 to emit radiation at a plurality of wavelengths and further controls optical detector 224 to detect the radiation at the plurality of wavelengths. Sensor 200 may be so informed, for example, via manual input from a user. Controller 220 processes signals concerning the amount of light detected by optical detector 224 to determine light transmission at each of the plurality of different wavelengths. For example, controller 220 may process signals concerning the amount of light detected by optical detector 224 to determine the amount or percentage of light absorbed by the fluid solution at each of the plurality of different wavelengths. Controller 220 may also process signals concerning the amount of light detected by optical detector 224 to determine the amount or percentage of light transmittance through the fluid solution at each of the plurality of different wavelengths. Controller 220 may store the light transmission data in memory 228.

After determining the amount of light detected by optical detector 224 through the reference solution, controller 220 processes the light detection information to develop a relationship between the known characteristic in the reference solution and the light detection information. Controller 220 stores the relationship as characteristic model 232 in memory 228.

In one example, controller 220 controls optical emitter 222 to emit radiation at a plurality of wavelengths and further controls optical detector 224 to detect the radiation at a plurality of wavelengths through a reference solution having a known pH. Controller 220 then processes the light detection information to develop a relationship between the known pH and the amount of light detected at each of the plurality of different wavelengths and stores the relationship as a pH model in memory 228.

In another example, controller 220 controls optical emitter 222 to emit radiation at a plurality of wavelengths and further controls optical detector 224 to detect the radiation at a plurality of wavelengths through a reference solution having a known concentration of one or more chemical species. In the case of a hypochlorous acid solution, the known concentration of a chemical species may be a known concentration of a chlorine species such as, e.g., diatomic chlorine, hypochlorous acid, and/or hypochlorite. Controller 220 then processes the light detection information to develop a relationship between the known concentration and the amount of light detected at each of the plurality of different wavelengths and stores the relationship as a concentration model in memory 228.

In still other examples, controller 220 controls optical emitter 222 to emit radiation at a plurality of wavelengths and further controls optical detector 224 to detect the radiation at a plurality of wavelengths through a reference solution having a plurality of known characteristics (e.g., two, three, four or more known characteristics). For example, in the case of a hypochlorous acid solution, a plurality of known characteristics may include a known pH and a known concentration of a chlorine species. Controller 220 then processes the light detection information to develop a relationship between each of the plurality of known characteristics and the amount of light detected at each of the plurality of different wavelengths and stores the relationships as a model in memory 228. Such a model may be referred to a solution model, which relates a plurality of characteristics in the fluid solution to light transmission at each of a plurality of different wavelengths.

Independent of the specific number or type of characteristics known in a reference solution, controller 220 can use any suitable technique to develop a relationship between the known characteristics of the reference solution and the light detection information received from optical detector 224. In some examples, controller 220 performs a partial least squares analysis to correlate one or more known characteristics in the reference solution to the light transmission at each of a plurality of wavelengths. In such an example, controller 220 may employ any suitable statistical software package such as, e.g., Minitab, Excel, or the like, to perform the partial least squares analysis.

In general, partial least squares (PLS) analysis, which is also referred to as partial least squares regression, is a multivariate data analysis technique that can be used to extract components (also called factors) that relate one or more response variables (Y) to several input variables (also called explanatory or predictor variables) (X). The technique attempts to identify the underlying factors, or a linear combination of the X variables, which best model the Y dependent variables. Partial least squares analysis can deal effectively with data sets where there are multiple input variables (X) and the input variables are highly correlated. Partial least squares analysis can also deal effectively with data sets where there are more input variables than response variables. Accordingly, while sensor 200 can use other regression or data processing techniques to develop characteristic model 232, a partial least squares analysis may be useful in applications where there are more input variables than response variables. In addition, a partial least squares analysis may be useful in applications where there are complex relationships among variables such as, e.g., in solutions with multiple species in equilibrium, because a partial least squares analysis may model relationships and reduce the dimensionality of data, helping to simplify an analysis and its comprehension.

In applications where light transmission measurements are made through a reference solution at more wavelengths than there are known characteristics for the reference solution, controller 220 may be required to process more input variables than response variables. For this reason, controller 220 may perform a partial least squares analysis in these applications.

In applying the partial least squares analysis, controller 220 treats the one or more known characteristics of the reference solution as a response variable(s) and the light transmission measurements as input variables. Controller 220 then performs the partial least squares analysis to correlate each of the response variables (i.e., each known characteristic of the reference solution) with the input variables (e.g., light transmission measurements at the plurality of different wavelengths).

Controller 220 processes the light transmission measurements and one or more known characteristics using partial least squares analysis techniques to develop characteristic model 232. Characteristic model 232 can have a number of different forms depending on the relationship between the known characteristic(s) of the reference solution and the light detected by optical detector 224 at each of the plurality of different wavelengths. In some examples, controller 220 may determine a characteristic model 232 that has the following form:

$$\text{characteristic} = \beta_0 + \sum_{i=1}^{n} \beta_i A_i$$

where n is a number of discrete wavelengths for which transmission measurements are made, $\beta_0$ is a constant, $\beta_i$ is a coefficient for each respective wavelength, and $A_i$ is the magnitude of light (e.g., absorbance or transmittance) measured at each respective wavelength. In such an example, controller 220 determines the constant $\beta_0$ and an appropriate coefficient $\beta_i$ for each of the wavelengths emitted by optical emitter 222 and detected by optical detector 224, e.g., using partial least squares analysis techniques. Controller 220 can then store the determined constant and coefficients as characteristic model 232 in memory 228.

In examples where a reference solution includes more than one known characteristic (e.g., both pH and the concentration of a chlorine species), controller 220 determines separate characteristic models for each of the known characteristics. In other examples, each characteristic model has the same general form, such as the form indicated above. In these examples, controller 220 determines different constants and coefficients for each characteristic model. For instance, in the example of a cleaning solution that has a known pH and a known concentration of hypochlorite, controller 220 may determine a pH model and a concentration model that have the following general forms:

$$\text{pH} = \beta_0^1 + \sum_{i=1}^{n} \beta_i^1 A_i$$

$$\text{concentration } ^-OCl = \beta_0^2 + \sum_{i=1}^{n} \beta_i^2 A_i$$

where n is a number of discrete wavelengths for which transmission measurements are made, $\beta_0^1$ and $\beta_0^2$ are constants, $\beta_i^1$ and $\beta_i^2$ are coefficients for each respective wavelength, and $A_i$ is the magnitude of light measured at each respective wavelength. Controller 220 determines the constants $\beta_0^1$ and $\beta_0^2$ and appropriate coefficients $\beta_i^1$ and $\beta_i^2$ for each of the wavelengths emitted by optical emitter 222 and detected by optical detector 224. Controller 220 then stores the determined constants and coefficients as a pH model and concentration model in memory 228. In some examples, controller 220 determines both the pH model and concentration model based on the same set of light transmission measurements taken through the fluid solution.

Characteristic model 232 provides an estimate of a fluid characteristic from light detected by optical detector 224. Characteristic model 232 may be based on light detection information from a single reference solution having a known characteristic or from a plurality of reference solutions (e.g., two, three, four, or more references solutions) that each have a known characteristic. For example, characteristic model 232 may be based on light detection information from a plurality of reference solutions, where each of the plurality of reference solutions has the same known characteristic, and where each reference solution has a known characteristic that exhibits a different magnitude than the known characteristic of each of the other reference solutions.

In applications where characteristic model 232 is based on light detection information from a single reference solution, controller 220 controls optical emitter 222 to emit radiation at a plurality of wavelengths and further controls optical detector 224 to detect the radiation at the plurality of wavelengths as the reference solution passes through fluid pathway 230. Controller 220 then processes the light detection information, e.g., using partial least squares analysis techniques, to determine characteristic model 232, as set forth above.

In applications where characteristic model 232 is based on light detection information from a plurality of reference solutions, controller 220 controls optical emitter 222 to emit radiation at a plurality of wavelengths and further controls optical detector 224 to detect the radiation at the plurality of wavelengths as each of the plurality of references solution passes through fluid pathway 230. Controller 220 stores the light detection information from each of the plurality of reference solutions in memory 228. Controller 220 may also store a value for one or more known characteristics of each reference solution in memory 228. Controller 220 can receive the value of the one or more known characteristics for each reference solution, for example, via manual user input.

After storing light detection information from a sufficient number of reference solutions, controller 220 processes the light detection information from all of the reference solutions to generate characteristic model 232. In applications where controller 220 generates characteristic model 232 based on a partial least squares analysis, controller 220 treats the known characteristics of all of the reference solutions as response variables and the light transmission measurements from all of the reference solutions as input variables. Controller 220 then performs the partial least squares analysis to correlate the response variables with the input variables. Based on the analysis, controller 220 determines characteristic model 232 and stores the determined characteristic model in memory 228.

Once characteristic model 232 is stored in memory 228, controller 220 can reference the characteristic model to determine a magnitude of an unknown characteristic in a sample based on light transmission measurements taken on the sample. For instance, in one example, controller 220 controls optical emitter 222 to emit radiation at a plurality of wavelengths and further controls optical detector 224 to detect the radiation at a plurality of wavelengths through a fluid solution having an unknown characteristic of interest. Controller 220 processes signals concerning the amount of light detected by optical detector 224 to determine light transmission at each of the plurality of different wavelengths. Thereafter, controller 220 determines an estimate of the unknown characteristic based on the determined light transmission measurements at each of the plurality of wavelengths and the characteristic model. In instances where the characteristic model is in the form of an equation that relates light transmission values to a specific characteristic, controller 220 can enter the determined light transmission values into the equation and solve the equation to provide an estimate of the unknown characteristic of interest.

Figure 4:
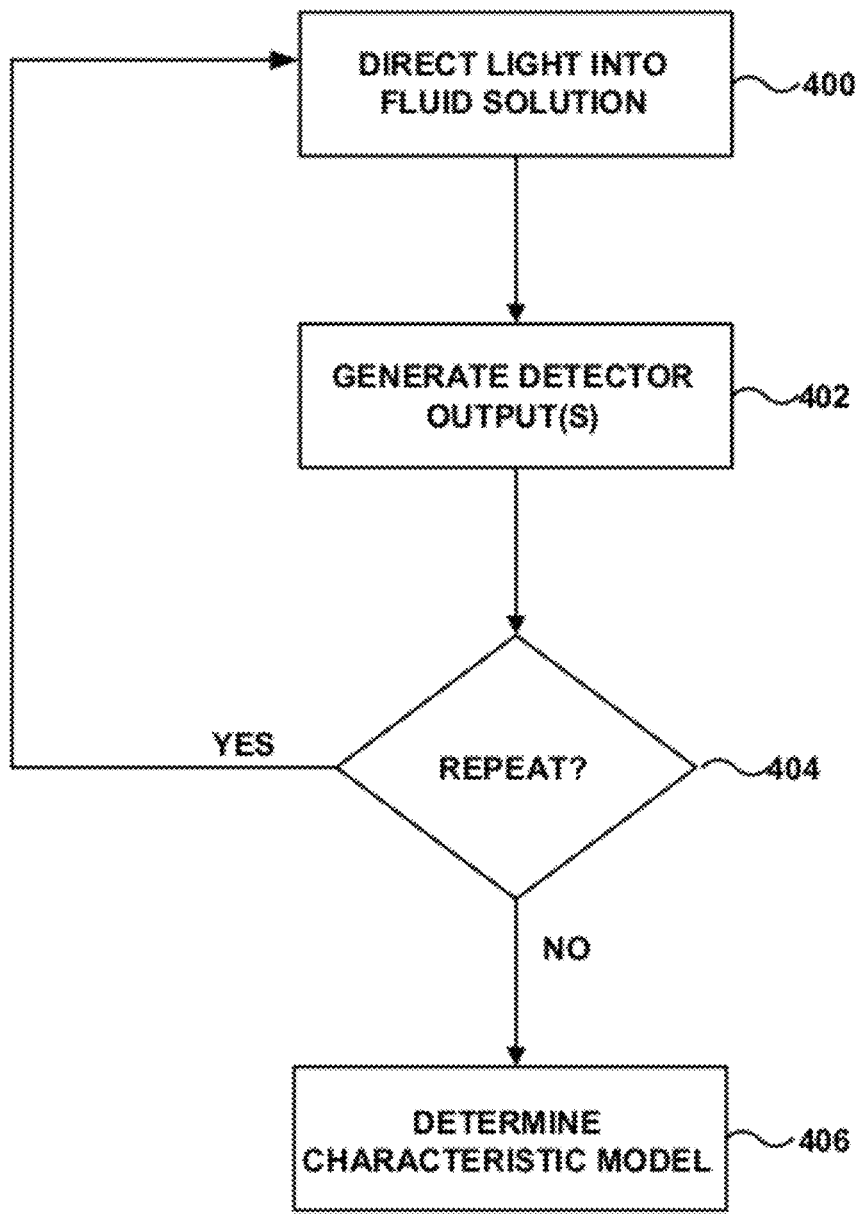
FIG. 4 is a flow diagram illustrating an example process by which an optical sensor determines a characteristic model.

FIG. 4 is a flow diagram illustrating an example process by which sensor 200 (FIG. 3) determines characteristic model 232. According to the example process, optical emitter 222 directs light into a reference solution flowing through fluid pathway 230 (400). The reference solution has a known pH and a known concentration of hypochlorite. Optical emitter 222 may include, for example, an optical emitter that emits light in the UV wavelength range.

Optical detector 224 generates detector outputs based upon detection of light at a plurality of discrete wavelengths transmitted through the reference solution (402). For example, optical detector 224 may include a first detector that generates a first detector output corresponding to emitted light at a first wavelength or wavelength range transmitted through the reference solution. Optical detector 224 may further include a second detector that generates a second detector output corresponding to emitted light within at a second wavelength or wavelength range transmitted through the reference solution.

Optical detector 224 may also include additional detectors that generate additional detector outputs (e.g., third, fourth, etc.) based on the amount of light received at additional wavelengths or wavelength ranges. Alternatively, a single detector may generate all or a subcombination of the detector outputs.

Optical emitter 222 optionally directs light into additional reference solutions flowing through fluid pathway 230 (404). Each of the reference solutions has a known pH and a known concentration of hypochlorite. In some examples, at least one reference solution has a different pH than that of at least one other reference solution. In some additional examples, at least one reference solution has a different concentration of hypochlorite than that of at least one other reference solution. As each of the reference solutions passes through fluid pathway 230, optical emitter 222 directs light into the reference solution (400) and optical detector 224 generates detector outputs based upon detection of light at a plurality of discrete wavelengths transmitted through the reference solution (402).

Controller 220 determines characteristic model 232 based on the known characteristics of the reference solution(s) and the detector outputs determined by detecting light at a plurality of different wavelengths transmitted through each of the reference solution(s) (406). For example, controller 220 may perform a partial least squares analysis where the known pH and known concentration of hypochlorite of each of the reference solution(s) are treated as response variables and the detector outputs corresponding to each of the reference solutions at each of the plurality of discrete wavelengths are treated as input variables. In some examples, controller 220 performs a partial least squares analysis to determine the constants and coefficients for the following equations:

$$pH = \beta_0^1 + \sum_{i=1}^{n} \beta_i^1 A_i$$

$$\text{concentration }^-OCl = \beta_0^2 + \sum_{i=1}^{n} \beta_i^2 A_i$$

where n is a number of discrete wavelengths for which transmission measurements are made, $\beta_0^1$ and $\beta_0^2$ are constants, $\beta_i^1$ and $\beta_i^2$ are coefficients for each respective wavelength, and $A_i$ is the magnitude of light measured at each respective wavelength. The first equation may be referred to as a pH model and the second equation may be referred to as a concentration model. The determined constants and coefficients, with or without the corresponding equations, can be stored in memory 228 as characteristic model 232.

Figure 5:
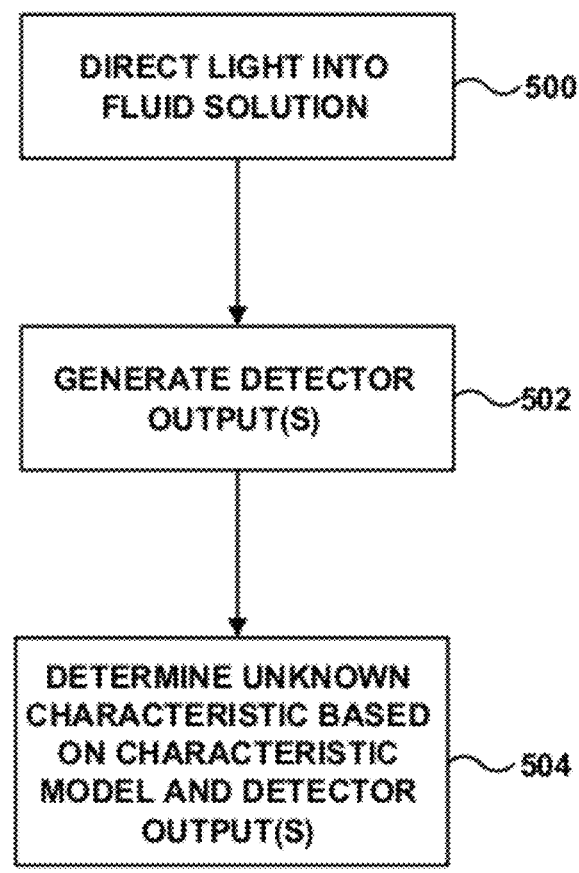
FIG. 5 is a flow diagram illustrating an example process by which an optical sensor determines an estimate of an unknown characteristic based on a characteristic model.

FIG. 5 is a flow diagram illustrating an example process by which sensor 200 (FIG. 3) determines an estimate of an unknown characteristic of interest based on characteristic model 232. According to the example process, optical emitter 222 directs light into a fluid solution flowing through fluid pathway 230 (500). The fluid solution has a unknown pH and a unknown concentration of hypochlorite.

Optical detector 224 generates detector outputs based upon detection of light at a plurality of discrete wavelengths or wavelength ranges transmitted through the fluid solution (502). The discrete wavelengths or wavelength ranges may be the same wavelengths or wavelength ranges detected by optical detector 224 in determining characteristic model 232 (FIG. 4).

Controller 220 determines an estimate of the unknown pH and the unknown concentration of hypochlorite based on characteristic model 232 and the detector outputs determined by detecting light at the plurality of discrete wavelengths transmitted through the fluid solution (504). For instance, in examples where characteristic model 232 includes a pH model and a concentration model in the form of the two equations discussed above with respect to FIG. 4, controller 220 can calculate an estimated pH for the fluid solution and an estimated concentration of hypochlorite in the fluid solution using the detector outputs and the equations. In some examples, controller 220 substantially simultaneously determines a pH estimate and a concentration estimate for a fluid solution based on the same set of light transmission measurements taken through the fluid solution.

As briefly discussed above, optical emitter 222 (FIG. 3) may emit radiation over a range of wavelengths and, in some cases, may emit radiation at a plurality of discrete wavelengths. Optical emitter 222 can emit radiation at any suitable wavelengths, and the wavelengths may vary, e.g., based on the chemical composition of the fluid solution being analyzed.

Figure 6:
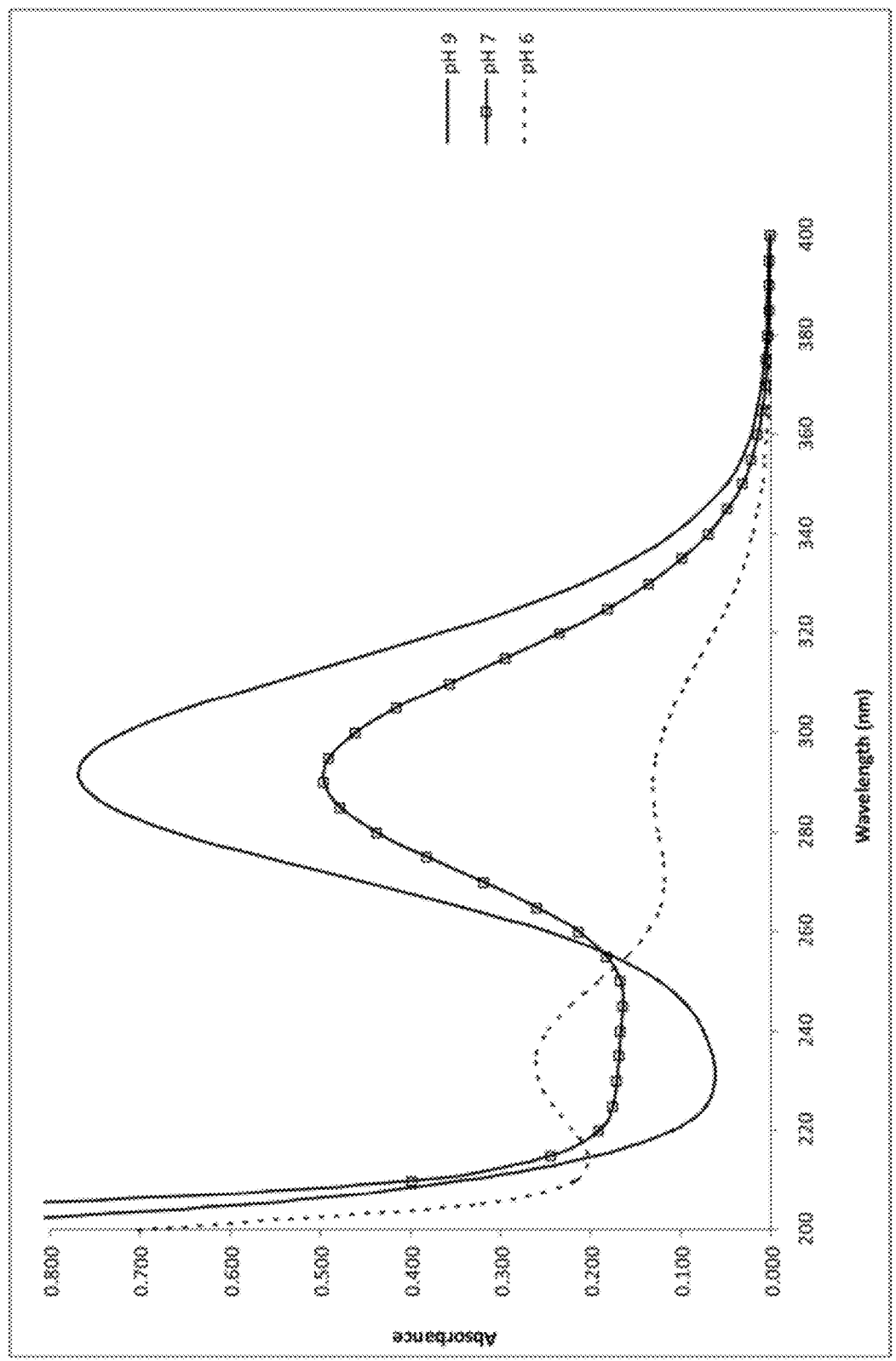
FIG. 6 is a plot of absorbance versus optical wavelength for an example hypochlorous acid solution at three different pH values.

FIG. 6 is a plot of absorbances versus optical wavelengths for an example hypochlorous acid solution at three different pH values. The plot indicates that for the example hypochlorous acid solution, the optical response of the solution varies depending on the wavelength of light directed through the solution and the chemical composition of the solution. Specifically, for the example hypochlorous acid solution illustrated in FIG. 6 (in which hypochlorite species predominates at a pH of 9, hypochlorous acid species predominates at a pH of 6, and a substantially equal mixture of the two species exists at a pH of 7) the plot shows that optical response varies depending on the pH of the hypochlorous acid solution. The plot of FIG. 6 also illustrates an isobestic point at approximately 250 nm, which is a point where optical response is substantially independent of the pH of the hypochlorous acid solution.

Since the optical response at a given wavelength may vary depending on the chemical composition of a fluid solution, as indicated by FIG. 6, optical emitter 222 (FIG. 3) may emit, and optical detector 224 may detect, radiation at two or more wavelengths during operation. Increasing the number of wavelengths emitted and/or detected by sensor 200 may increase the accuracy of sensor 200 when analyzing a fluid solution that has an unknown chemical composition and/or unknown characteristic of interest.

Sensor 200 can be programmed to emit and/or detect light at any suitable wavelength. In one example, sensor 200 emits and/or detects light through a fluid solution at two or more wavelengths, where at least one of the wavelengths is an isobestic point of the fluid solution. In another example, sensor 200 emits and/or detects light through a fluid solution at two or more wavelengths, where at least one of the wavelengths corresponds to an optical response (e.g., absorbance or transmittance) minimum or maximum of a chemical species. For example, in a fluid solution that includes multiple chemical species, sensor 200 may emit and/or detect light at a first wavelength that corresponds to an optical response (e.g., absorbance or transmittance) minimum or maximum of a first chemical species and further emit and/or detect light at a second wavelength that corresponds to an optical response (e.g., absorbance or transmittance) minimum or maximum of a second chemical species. Sensor 200 may emit and/or detect light at additional wavelengths (e.g., third wavelength, fourth wavelength, etc.) that correspond to an optical response (e.g., absorbance or transmittance) minimum or maximum of additional chemical species (e.g., third chemical species, fourth chemical species, etc.).

In some examples, sensor 200 emits and/or detects light through a fluid solution at two or more wavelengths, where at least one of the wavelengths is an isobestic point of the fluid solution, and where at least one of the wavelengths corresponds to an optical response (e.g., absorbance or transmittance) minimum or maximum of a chemical species. For instance, sensor 200 may emit and/or detect light through a fluid solution at three or more wavelengths, where a first wavelength corresponds to an optical response (e.g., absorbance or transmittance) minimum or maximum of a first chemical species (e.g., HOCl), a second wavelength corresponds to an optical response (e.g., absorbance or transmittance) minimum or maximum of a second chemical species (e.g., $^-$OCl), and a third wavelength corresponds to an isobestic point of the fluid solution.

In some examples, sensor 200 emits and/or detects light through a fluid solution at three or more wavelengths, where a first wavelength is between approximately 225 nm and approximately 245 nm such as, e.g., approximately 236 nm, a second wavelength is between approximately 245 nm and approximately 275 nm such as, e.g., approximately 257 nm, and a third wavelength is between approximately 275 nm and 325 nm such as, e.g., approximately 296 nm. Sensor 200 may emit and/or detect light through the fluid solution at additional or different wavelengths. For example, sensor 200 may emit and/or detect light through the fluid solution at a fourth wavelength between approximately 220 nm and approximately 240 nm such as, e.g., 230 nm.

In general, increasing the number of wavelengths emitted and/or detected by sensor 200 may increase the accuracy of sensor 200 when analyzing a fluid solution that has an unknown characteristic of interest. However, increasing the number of wavelengths emitted and/or detected by sensor 200 may increase the computational burden and, hence, processing time for determine the unknown characteristic of interest in a fluid solution.

Figure 7:
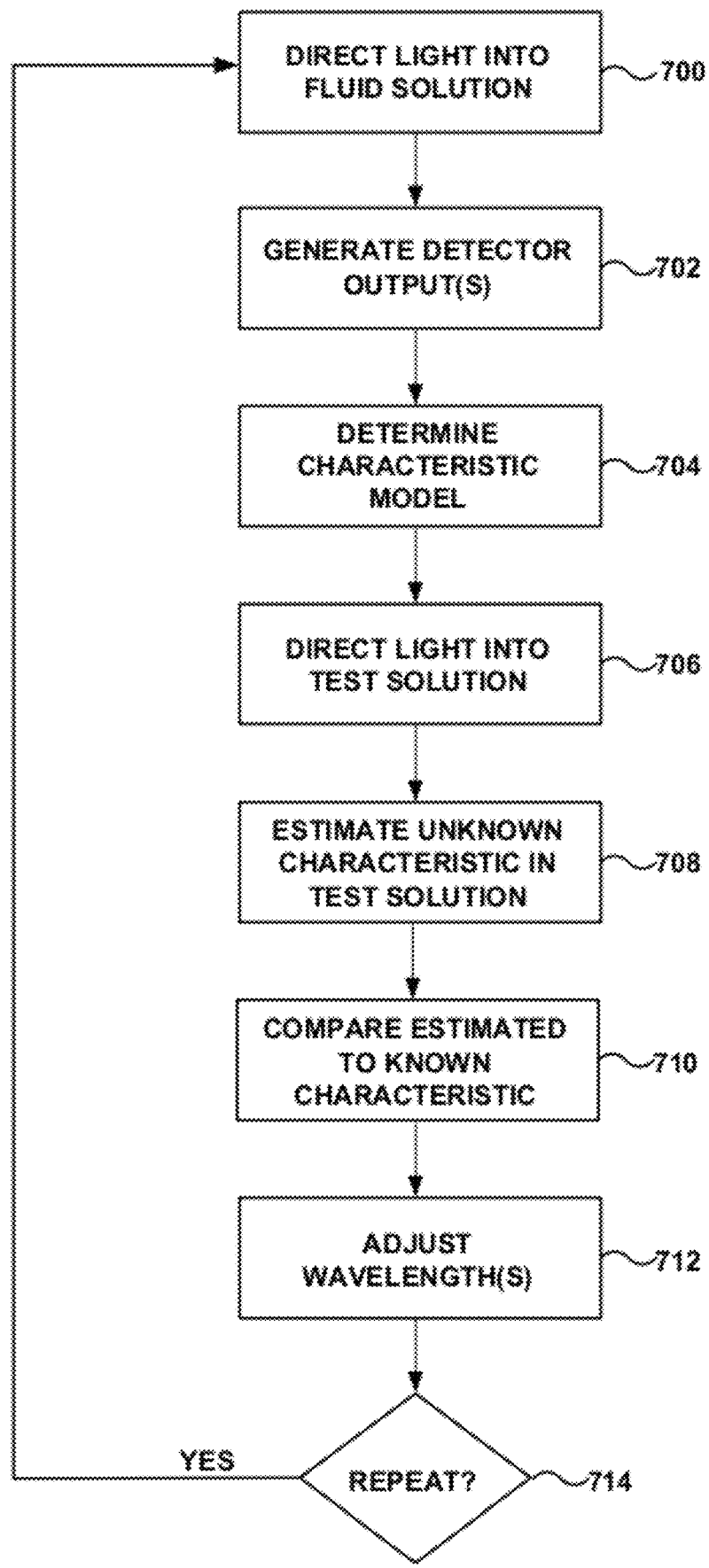
FIG. 7 is a flow diagram illustrating an example method for determining wavelengths that an optical sensor can emit and/or detect through a fluid solution to determine an unknown characteristic in the fluid solution.

FIG. 7 is a flow diagram illustrating an example method for determining suitable wavelengths of light that sensor 200 (FIG. 3) can emit and/or detect through a fluid solution to determine an unknown characteristic in the fluid solution. According to the example method, optical emitter 222 directs light at a plurality of different wavelengths into a reference solution flowing through fluid pathway 230 (700). The reference solution has a known pH and a known concentration of hypochlorite. The plurality of different wavelengths may be at least 5 different wavelengths such as, e.g., at least 25 different wavelengths, at least 50 different wavelengths, or even at least 100 different wavelengths. Some or all of the different wavelengths may be within the UV light spectrum.

Optical detector 224 generates detector outputs based upon detection of light at each of the plurality of wavelengths transmitted through the reference solution (702). In some examples, optical detector 224 detects light at fewer wavelengths than are emitted by optical emitter 222. In some examples, optical detector 224 detects light at least 5 different wavelengths such as, e.g., at least 25 different wavelengths, at least 50 different wavelengths, or even at least 100 different wavelengths In some examples, optical emitter 222 directs light at the plurality of different wavelengths and/or optical detector detects light at the plurality of different wavelengths through additional reference solutions flowing through fluid pathway 230 that each have different known pH values and/or known concentrations of hypochlorite.

Controller 220 determines characteristic model 232 based on the known characteristics of the reference solution(s) and the detector outputs determined by detecting light at the plurality of different wavelengths transmitted through each of the reference solution(s) (704). For example, controller 220 may perform a partial least squares analysis where the known pH and known concentration of hypochlorite of each of the reference solution(s) are treated as response variables and the detector outputs corresponding to each of the reference solutions at each of the plurality of wavelengths are treated as input variables. In some examples, controller 220 performs a partial least squares analysis to determine the constants and coefficients for the following equations:

$$pH = \beta_0^1 + \sum_{i=1}^{n} \beta_i^1 A_i$$

$$\text{concentration } ^-OCl = \beta_0^2 + \sum_{i=1}^{n} \beta_i^2 A_i$$

where n is a number of discrete wavelengths for which transmission measurements are made, $\beta_0^1$ and $\beta_0^2$ are constants, $\beta_i^1$ and $\beta_i^2$ are coefficients for each respective wavelength, and $A_i$ is the magnitude of light measured at each respective wavelength.

After determining characteristic model 232, optical emitter 222 directs light at a plurality of different wavelengths into a test solution flowing through fluid pathway 230 and optical detector 224 generates detector outputs based on the detection of light at the plurality of different wavelengths (706). The test solution has a known pH and a known concentration of hypochlorite. The plurality of different wavelengths are the same wavelengths emitted by optical emitter 222 and/or detected by optical detector 224 through the reference solution(s) to determine characteristic model 232.

Controller 220 then determines an estimate of the pH and the concentration of hypochlorite in the test solution based on characteristic model 232 and the detector outputs determined by detecting light at the plurality of different wavelengths transmitted through the fluid solution (708). For example, controller 220 can provide the detector outputs determined by detecting light at the plurality of different wavelengths transmitted through the test solution to the characteristic model equations and solve the equations.

The estimated pH and estimated concentration of hypochlorite in the test solution are then compared to the known pH and known concentration of hypochlorite in the test solution, respectively, to determine the accuracy of the characteristic model (710). The number of wavelengths and/or the specific range of wavelengths emitted and/or detected by sensor 200 can then be adjusted accordingly (712).

In some examples, the number of wavelengths emitted and/or detected by sensor 200 are increased to increase the accuracy of characteristic model 232. In some additional examples, the specific wavelengths emitted and/or detected by sensor 200 are varied to adjust (e.g., increase) the accuracy of characteristic model 232. In other examples, such as where characteristic model 232 yields a suitably accurate characteristic estimate, the number of wavelengths emitted and/or detected by sensor 200 can be decreased to reduce the computation burden required to estimate a characteristic. For example, if one or more wavelengths exhibit a high correlation with another wavelength, the one or more highly correlated wavelengths can be omitted to reduce the computation burdened required by sensor 200.

The process is then repeated to determine suitable wavelengths emitted and/or detected by sensor 200 (714). In some examples, the process is repeated to minimize the number of wavelengths emitted and/or detected by sensor 200 while still providing a characteristic model that has a suitable accuracy. A suitable accuracy may be a characteristic model that provides a characteristic estimate within 25 percent of the known value of the characteristic such as, e.g., within 10 percent of the known value of the characteristic, or with 5 percent of the known value of the characteristic. In some examples, the process is repeated so that sensor 200 emits and/or detects only two different wavelengths, only three different wavelengths, or only four different wavelengths.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a non-transitory computer-readable medium, such as a computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The following example may provide additional details about optical sensing techniques in accordance with this disclosure.

Example

Four samples of hypochlorous acid solution were prepared having sodium hypochlorite concentrations of 25 parts per million (ppm), 50 ppm, 100 ppm, and 200 ppm, respectively. The pH of the four samples was adjusted to approximately 6.0. Additional samples having pH values of approximately 7.0 and approximately 9.0 were also prepared to provide a total of twelve hypochlorous acid solution samples.

Figure 8A:
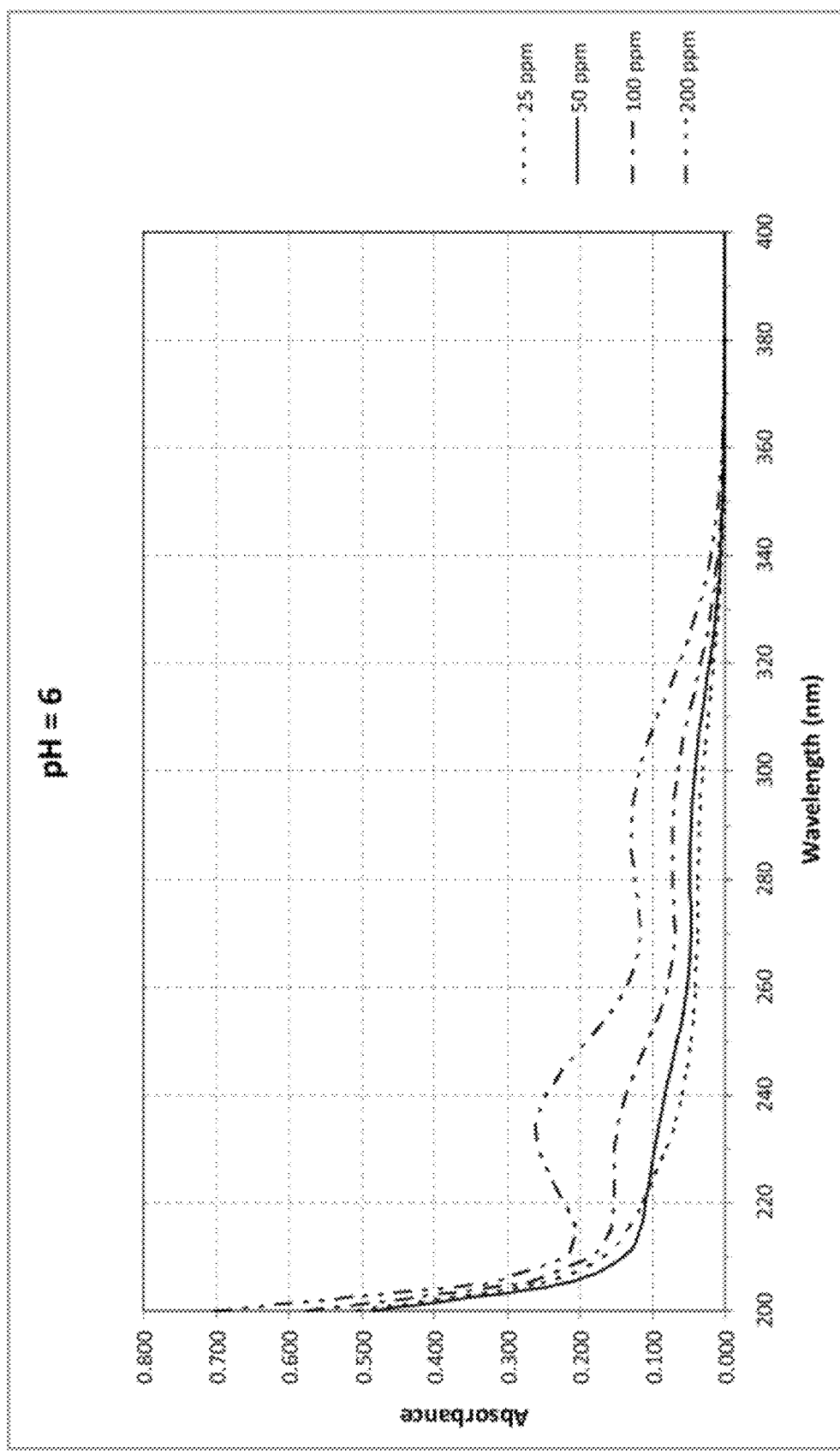
FIGS. 8A-8C are plots of example absorbance versus wavelength data for twelve different fluid solutions.
Figure 8B:
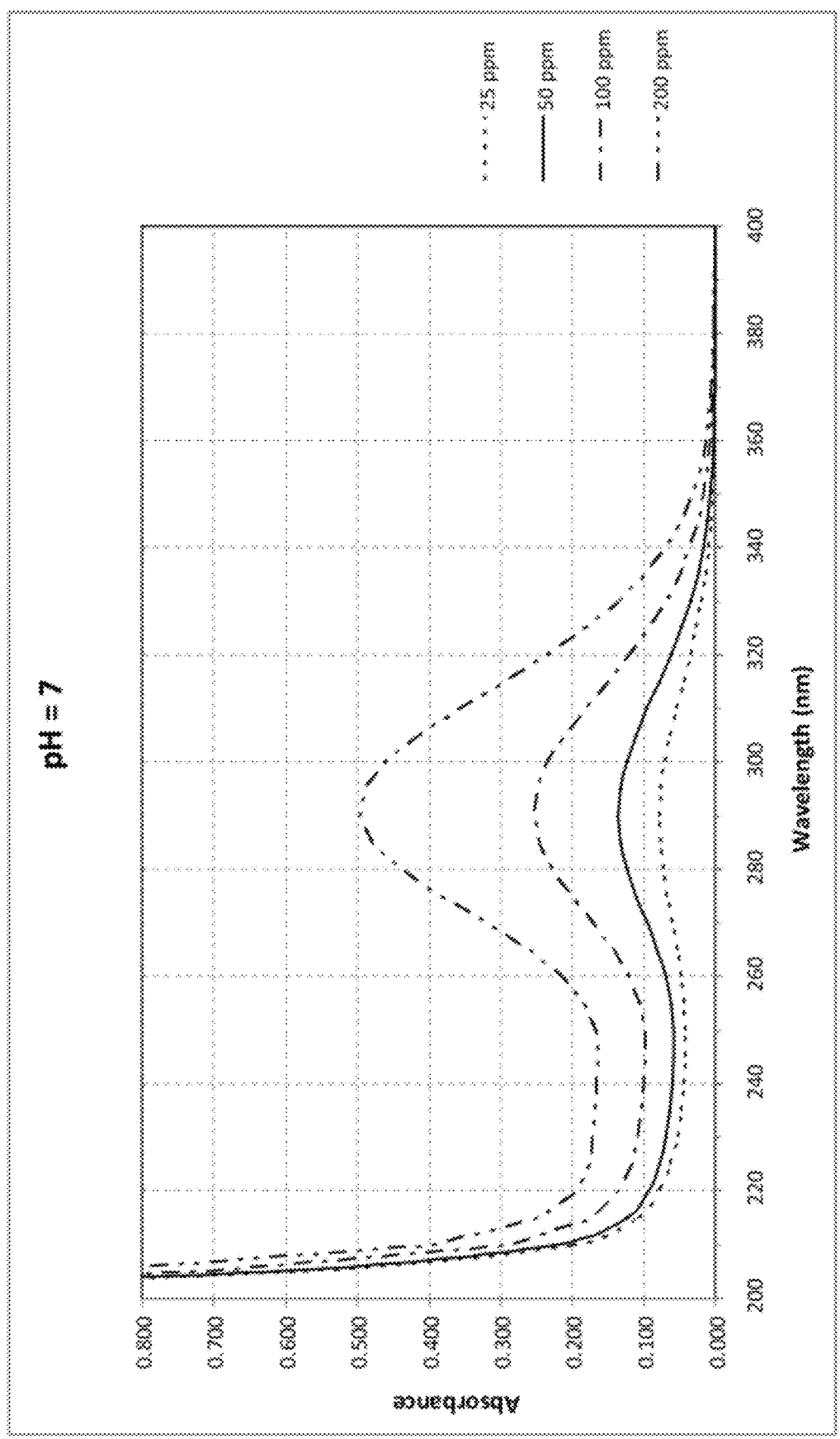
Figure 8C:
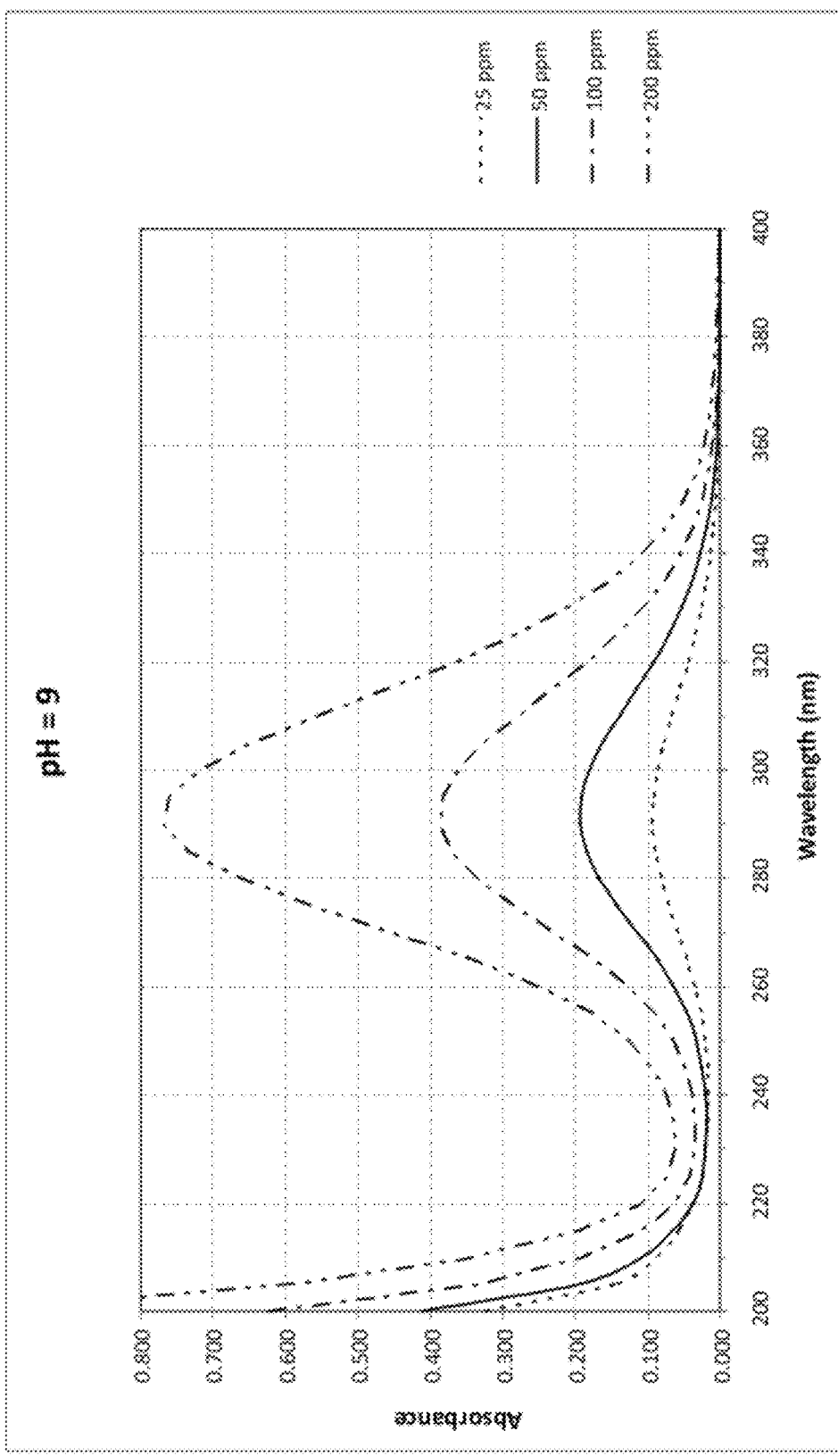

All twelve samples were spectrophotometrically analyzed at 401 different wavelengths, beginning at a wavelength of 200 nm and increasing in 0.5 nm increments up to a wavelength of 400 nm. FIGS. 8A-8C are plots of absorbance versus wavelength for each of the twelve different samples at a pH values of approximately 6.0, 7.0, and 9.0, respectively.

To process the data, the raw spectral data were formatted into a 401×12 matrix with rows being wavelengths and columns being the 12 samples (i.e., the different pH and concentration combinations). The cell entries in the matrix were absorbance readings at the specific wavelengths for each concentration/pH group (i.e., each sample). The data were then transposed to provide 12 rows of concentration/pH groups and 401 columns of wavelengths.

Next, the data were examined for correlations between the absorbance readings at different wavelengths. In general, the data showed high correlations among adjacent wavelengths and decreasing correlations as wavelengths became further apart from one another. For example, the correlation coefficient (r) between the absorbance reading at 200 nm and 231 nm was over 0.999, while the correlation between 200 nm and 254 nm was 0.487, and the correlation between 200 nm and 296 nm was 0.003.

After identifying correlations between different wavelengths, a step-wise approach was employed to identify both the specific wavelengths and a minimal number of wavelengths for partial least squares analysis. To begin, data from all 401 wavelengths were fit to a pH model and concentration model using partial least squares analysis techniques. Next, data from highly correlated wavelengths were removed from the data matrix, and the pH model and concentration model were recalculated (e.g., refit) using partial least squares analysis techniques and the reduced data set. The process was repeated until predictions (e.g., estimates) from the models deteriorated below a predetermined level such as, e.g., an $R^2$ value below 95%. Following this process, four wavelengths were selected for the pH model and concentration model: 230 nm, 236 nm, 257 nm, and 296 nm. The wavelengths exhibited acceptable model performance for the hypochlorous acid solutions under study while minimizing computational resources.

After downsizing the data matrix to the four selected wavelengths, the pH model and concentration model were recalculated using partial least squares analysis techniques and the further reduced data set. The example used the Minitab statistical software package, although other software packages could be used. In performing the partial least squares analysis, the response variables were the concentration and pH of each of the twelve samples, and the input variables were the absorbance readings at 230 nm, 236 nm, 257 nm, and 296 nm for each of the twelve samples. The analysis results are illustrated in FIG. 9.

Figure 10:
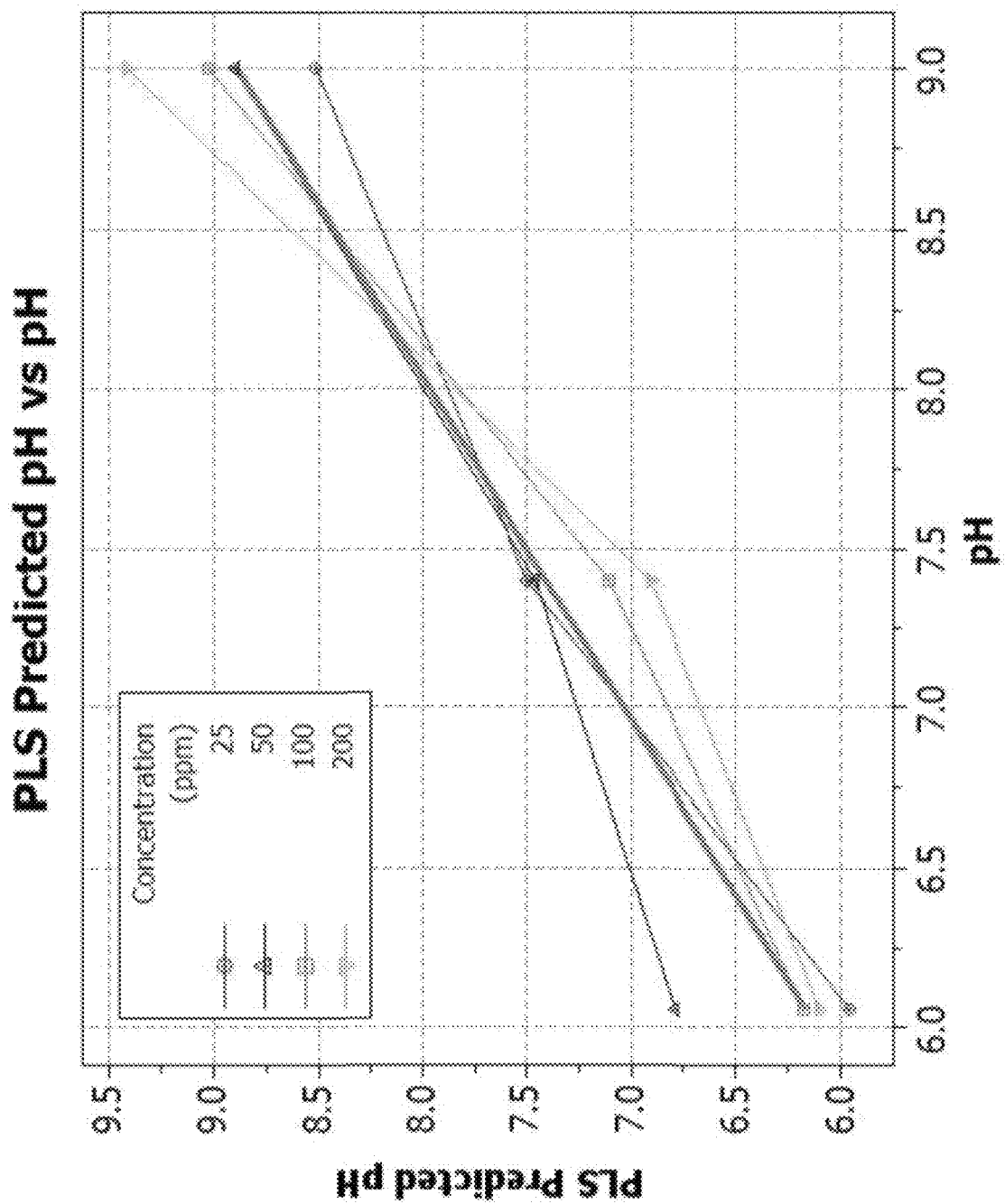
FIG. 10 is a plot of example estimated pH values versus actual pH values for a plurality of samples.
Figure 11:
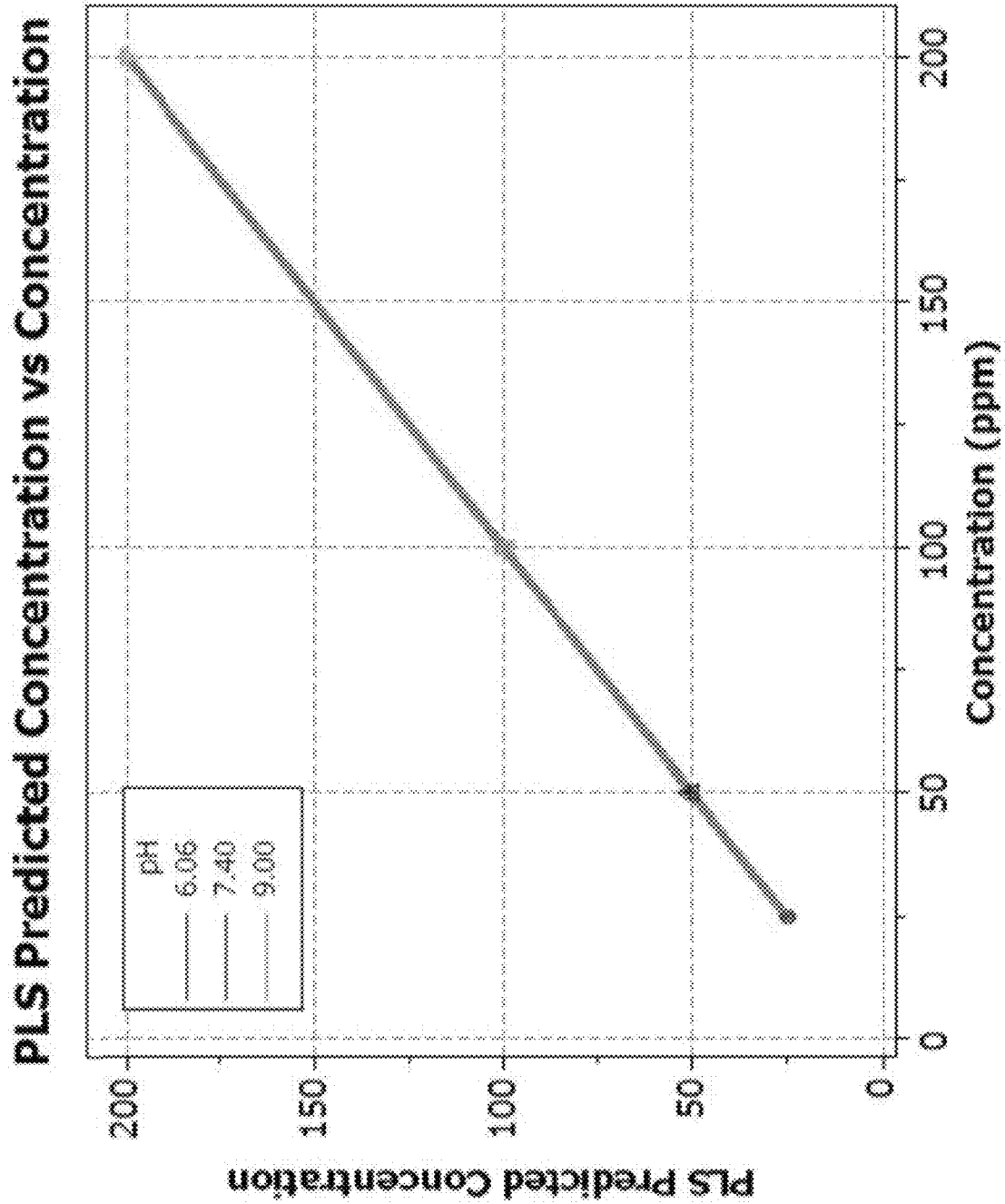
FIG. 11 is a plot of example estimated hypochlorite concentrations versus actual hypochlorite concentrations for the plurality of samples of FIG. 10.

Having determined constants and coefficients for the pH model and concentration model, the models were evaluated using test samples having known pH values and known concentrations of hypochlorous acid. Specifically, the test samples were spectrophotometrically analyzed at wavelengths of 230 nm, 236 nm, 257 nm, and 296 nm. Absorbance readings at each respective wavelength for each sample were entered into the determined pH model and concentration model to estimate a pH and a hypochlorite concentration for each sample. FIG. 10 is a plot of the estimated pH versus the actual or known pH for each sample. The data in FIG. 10 exhibit an $R^2$ value of approximately 92.3, although other examples have exhibited an $R^2$ value of at least 97. FIG. 11 is a plot of the estimated hypochlorite concentration versus the actual or known hypochlorite concentration. The data in FIG. 11 exhibit an $R^2$ value of approximately 99.99.

Various examples of the invention have been described. Although the present invention has been described in considerable detail with reference to certain disclosed embodiments, the embodiments are presented for purposes of illustration and not limitation. Other embodiments incorporating the invention are possible. One skilled in the art will appreciate that various changes, adaptations, and modifications may be made without departing from the spirit of the invention and the scope of the appended claims.

What is claimed is:

1. A method comprising:
    directing light at a plurality of different wavelengths into at least one reference fluid using an optical emitter, wherein the at least one reference fluid has a known pH and a known concentration of a chemical species of the at least one reference fluid;
    detecting light at each of the plurality of wavelengths transmitted through the at least one reference fluid using an optical detector and producing therefrom a plurality of detector outputs;
    determining a pH characteristic model by performing a partial least squares analysis where the plurality of detector outputs are input variables and the known pH of the at least one reference fluid is a response variable, wherein the partial least squares analysis provides a pH constant numerical value of the pH characteristic model, and wherein the partial least squares analysis provides a pH coefficient numerical value of the pH characteristic model for each of the plurality of detector outputs;
    determining a concentration characteristic model by performing a partial least squares analysis where the plurality of detector outputs are input variables and the known concentration of a chemical species of the at least one reference fluid is a response variable, wherein the partial least squares analysis provides a concentration constant numerical value of the concentration characteristic model, and wherein the partial least squares analysis provides a concentration coefficient numerical value of the concentration characteristic model for each of the plurality of detector outputs;
    directing light at a plurality of different wavelengths into a cleaning solution using an optical emitter;
    detecting light at each of the plurality of wavelengths transmitted through the cleaning solution using an optical detector and producing therefrom a plurality of cleaning solution detector outputs;
    estimating a pH of the cleaning solution using the pH characteristic model, wherein the pH of the cleaning solution is estimated based on the plurality of cleaning solution detector outputs and the pH constant numerical value and the pH coefficient numerical value of the pH characteristic model;
    estimating a concentration of a chemical species of the cleaning solution using the concentration characteristic model, wherein the concentration of the chemical species of the cleaning solution is estimated based on the plurality of cleaning solution detector outputs and the concentration constant numerical value and the concentration coefficient numerical value of the concentration characteristic model; and
    adding an anolyte solution or a catholyte solution to the cleaning solution to adjust at least one of the pH and the concentration of the chemical species of the cleaning solution using at least one of the estimate of the pH of the cleaning solution provided by the pH characteristic model and the estimate of the concentration of the chemical species of the cleaning solution provided by the concentration characteristic model.

2. The method of claim 1, wherein the pH model provides an estimate of the pH of the cleaning solution according to a relationship $$pH = \beta_0^1 + \sum_{i=1}^{n} \beta_i^1 A_i,$$

and the concentration model provides an estimate of the concentration of the chemical species in the cleaning solution according to a relationship $$concentration = \beta_0^2 + \sum_{i=1}^{n} \beta_i^2 A_i,$$

where n is a number of wavelengths for which optical transmission measurements are made, $\beta_0^1$ and $\beta_1^2$ are constants the respective pH constant numerical value and the concentration constant numerical value, $\beta_i^1$ and $\beta_i^2$ are the respective pH coefficient numerical value and the concentration coefficient numerical value for each respective wavelength, and $A_i$ is an optical transmission measurement for each respective wavelength corresponding to at least one of the plurality of detector outputs.

3. The method of claim 1, wherein the pH characteristic model is a separate model from the concentration characteristic model.

4. The method of claim 1, wherein the pH constant numerical value and the pH coefficient numerical value are different than the concentration constant numerical value and the concentration coefficient numerical value.

5. The method of claim 2, wherein the plurality of wavelengths comprises a first wavelength between approximately 220 nm and approximately 240 nm, a second wavelength between approximately 225 nm and approximately 245 nm, a third wavelength between approximately 245 nm and 275 nm, and a fourth wavelength between approximately 275 nm and approximately 325 nm.

6. The method of claim 5, wherein the first wavelength is approximately 230 nm, the second wavelength is approximately 236 nm, the third wavelength is approximately 257 nm, and the fourth wavelength at approximately 296 nm.

7. A sensor comprising:
an emitter that directs light into a cleaning solution and at least one reference fluid at a plurality of different wavelengths, wherein the at least one reference fluid has a known pH and a known concentration of a chemical species of the at least one reference fluid, wherein the plurality of wavelengths comprises a first wavelength between approximately 225 nm and approximately 245 nm, a second wavelength between approximately 245 nm and 275 nm, and a third wavelength between approximately 275 nm and approximately 325 nm;
a detector that detects light at each of the plurality of wavelengths transmitted through the cleaning solution and at each of the plurality of wavelengths transmitted through the at least one reference fluid and produces therefrom a plurality of detector outputs for each of the cleaning solution and the at least one reference fluid; and
a controller configured to:
determine a pH characteristic model by performing a partial least squares analysis where the plurality of the at least one reference fluid detector outputs are input variables and the known pH of the at least one reference fluid is a response variable, wherein the partial least squares analysis provides a pH constant numerical value of the pH characteristic model, and wherein the partial least squares analysis provides a pH coefficient numerical value of the pH characteristic model for each of the plurality of the at least one reference fluid detector outputs,
determine a concentration characteristic model by performing a partial least squares analysis where the plurality of the at least one reference fluid detector outputs are input variables and the known concentration of a chemical species of the at least one reference fluid is a response variable, wherein the partial least squares analysis provides a concentration constant numerical value of the concentration characteristic model, and wherein the partial least squares analysis provides a concentration coefficient numerical value of the concentration characteristic model for each of the plurality of the at least one reference fluid detector outputs,
estimate a pH of the cleaning solution using the pH characteristic model, wherein the pH of the cleaning solution is estimated based on the plurality of cleaning solution detector outputs and the pH constant numerical value and the pH coefficient numerical value of the pH characteristic model,
estimate a concentration of a chemical species of the cleaning solution using the concentration characteristic model, wherein the concentration of the chemical species of the cleaning solution is estimated based on the plurality of cleaning solution detector outputs and the concentration constant numerical value and the concentration coefficient numerical value of the concentration characteristic model, and
output a communication signal for adding an anolyte solution or a catholyte solution to the cleaning solution to adjust at least one of the pH and the concentration of the chemical species of the cleaning solution using at least one of the estimate of the pH of the cleaning solution provided by the pH characteristic model and the estimate of the concentration of the chemical species of the cleaning solution provided by the concentration characteristic model.

8. The sensor of claim 7, wherein the pH model provides an estimate of the pH of the cleaning solution according to a relationship $$pH = \beta_0^1 + \sum_{i=1}^{n} \beta_i^1 A_i,$$

and the concentration model provides an estimate of the concentration of the chemical species in the cleaning solution according to a relationship $$concentration = \beta_0^2 + \sum_{i=1}^{n} \beta_i^2 A_i,$$

where n is a number of wavelengths for which optical transmission measurements are made, $\beta_0^1$ and $\beta_0^2$ are the respective pH constant numerical value and the concentration constant numerical value, $\beta_i^1$ and $\beta_i^2$ are the respective pH coefficient numerical value and the concentration coefficient numerical value for each respective wavelength, and $A_i$ is an optical transmission measurement for each respective wavelength corresponding to at least one of the plurality of detector outputs.

9. A system comprising:
an electrolytic cell configured to generate an anolyte stream and a catholyte stream; and
an optical sensor that comprises
an emitter that directs light at a plurality of different wavelengths into at least one of the anolyte stream or catholyte stream and into at least one reference fluid, wherein the at least one reference fluid has a known pH and a known concentration of a chemical species of the at least one reference fluid wherein the plurality of wavelengths comprises a first wavelength between approximately 225 nm and approximately 245 nm, a second wavelength between approximately 275 nm and approximately 325 nm, and a third wavelength between approximately 245 nm and 275 nm;
a detector that detects light at each of the plurality of wavelengths transmitted through the at least one of the anolyte stream or catholyte stream and at each of the plurality of wavelengths transmitted through the at least one reference fluid and produces therefrom a plurality of detector outputs for each of the at least one of the anolyte stream or catholyte stream and the at least one reference fluid; and
a controller configured to:
determine a pH characteristic model by performing a partial least squares analysis where the plurality of the at least one reference fluid detector outputs are input variables and the known pH of the at least one reference fluid is a response variable, wherein the partial least squares analysis provides a pH constant numerical value of the pH characteristic model, and wherein the partial least squares analysis provides a pH coefficient numerical value of the pH characteristic model for each of the plurality of the at least one reference fluid detector outputs,
determine a concentration characteristic model by performing a partial least squares analysis where the plurality of the at least one reference fluid detector outputs are input variables and the known concentration of a chemical species of the at least one reference fluid is a response variable, wherein the partial least squares analysis provides a concentration constant numerical value of the concentration characteristic model, and wherein the partial least squares analysis provides a concentration coefficient numerical value of the concentration characteristic model for each of the plurality of the at least one reference fluid detector outputs, estimate a pH of the at least one of the anolyte stream or catholyte stream using the pH characteristic model, wherein the pH of the at least one of the anolyte stream or catholyte stream is estimated based on the plurality of anolyte stream or catholyte stream detector outputs and the pH constant numerical value and the pH coefficient numerical value of the pH characteristic model, estimate a concentration of a chemical species of the at least one of the anolyte stream or catholyte stream using the concentration characteristic model, wherein the concentration of the chemical species of the at least one of the anolyte stream or catholyte stream is estimated based on the plurality of anolyte stream or catholyte stream detector outputs and the concentration constant numerical value and the concentration coefficient numerical value of the concentration characteristic model, and output a communication signal for adding an anolyte solution or a catholyte solution to the at least one of the anolyte stream or catholyte stream to adjust at least one of the pH and concentration of the at least one of the anolyte stream or catholyte stream using at least one of the estimate of the pH of the at least one of the anolyte stream or catholyte stream provided by the pH characteristic model and the estimate of the concentration of the chemical species of the at least one of the anolyte stream or catholyte stream provided by the concentration characteristic model.

10. The system of claim 9, wherein the anolyte stream includes hypochlorous acid and hypochlorite in equilibrium, and the catholyte stream includes an alkali metal hydroxide, and wherein the concentration characteristic model provides the estimate of the concentration of the chemical species of the at least one of the anolyte stream or catholyte stream according to a relationship $$\text{characteristic} = \beta_0 + \sum_{i=1}^{n} \beta_i A_i,$$

where n is a number of wavelengths for which optical transmission measurements are made, $\beta_0$ is the concentration constant numerical value, $\beta_i$ is the concentration coefficient numerical value for each respective wavelength, and $A_i$ is an optical transmission measurement for each respective wavelength corresponding to at least one of the plurality of detector outputs.

11. The system of claim 9, wherein the pH model provides an estimate of the pH of the at least one of the anolyte stream or catholyte stream according to a relationship $$\text{pH} = \beta_0^1 + \sum_{i=1}^{n} \beta_i^1 A_i,$$

and the concentration model provides an estimate of the concentration of the chemical species in the at least one of the anolyte stream or catholyte stream according to a relationship $$\text{concentration} = \beta_0^2 + \sum_{i=1}^{n} \beta_i^2 A_i,$$

where n is a number of wavelengths for which optical transmission measurements are made, $\beta_0^1$ and $\beta_0^2$ are the respective pH constant numerical value and the concentration constant numerical value, $\beta_i^1$ and $\beta_i^2$ are the respective pH coefficient numerical value and the concentration coefficient numerical value for each respective wavelength, and $A_i$ is an optical transmission measurement for each respective wavelength corresponding to at least one of the plurality of detector outputs.

12. The system of claim 11, wherein the detector comprises one or more detectors that detect light at least three different wavelengths in an ultraviolet spectrum.

13. The system of claim 12, wherein the first wavelength is approximately 236 nm, the second wavelength is approximately 296 nm, and the third wavelength is approximately 257 nm.

* * * * *

UNITED STATES PATENT AND TRADEMARK OFFICE
CERTIFICATE OF CORRECTION

PATENT NO. : 10,746,653 B2
APPLICATION NO. : 13/094367
DATED : August 18, 2020
INVENTOR(S) : Paul R. Kraus and Victor N. Morin It is certified that error appears in the above-identified patent and that said Letters Patent is hereby corrected as shown below:

In the Claims

Column 20, Claim 2, Line 44, delete "$\beta_1^2$" and insert -- $\beta_0^2$ --

Column 20, Claim 2, Lines 44–45, delete "constants"

Signed and Sealed this
Tenth Day of November, 2020

Andrei Iancu
*Director of the United States Patent and Trademark Office*